US012771741B2

(12) United States Patent
Ranjan et al.

(10) Patent No.: US 12,771,741 B2
(45) Date of Patent: Oct. 20, 2026

(54) MOBILITY MANAGEMENT OF EDGE SERVERS IN A COMPUTING ENVIRONMENT

(71) Applicant: International Business Machines Corporation, Armonk, NY (US)

(72) Inventors: Paritosh Ranjan, Kolkata (IN); Tamojit Das, Stamford, CT (US); Erik Rueger, Ockenheim (DE); Prodip Roy, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 19/087,528

(22) Filed: Mar. 23, 2025

(65) Prior Publication Data

US 2026/0292018 A1 Sep. 24, 2026

(51) Int. Cl.
*H04L 67/1008* (2022.01)

(52) U.S. Cl.
CPC ................................ *H04L 67/1008* (2013.01)

(58) Field of Classification Search
CPC ................................................... H04L 67/1008
USPC .......................................................... 709/223
See application file for complete search history.

(56) References Cited

U.S. PATENT DOCUMENTS 3,067,281 A 12/1962 Pierre
7,525,207 B2 4/2009 Clidaras et al.
2013/0279334 A1* 10/2013 Xu ........................ H04L 47/125 370/235
2015/0382511 A1 12/2015 James et al.
2018/0234489 A1* 8/2018 Hammons ............... H04L 67/12
2020/0028908 A1 1/2020 Coleman et al.
2020/0250064 A1 8/2020 Ikkaku
2023/0156826 A1* 5/2023 Palermo ............ H04W 28/0268 370/329
2023/0185299 A1 6/2023 Das et al.
2024/0354207 A1 10/2024 Acharya Chandrashekar et al.
2026/0129090 A1* 5/2026 Abhishek ............ H04L 67/1008

FOREIGN PATENT DOCUMENTS

EP 4460944 A1 11/2024

OTHER PUBLICATIONS

Authors et. al.: Disclosed Without Attribution, IP.com No. IPCOM000272702D, "Method to Dynamically Toggle the State of an Edge Server Integrated into a UAV", Jul. 18, 2023, 8 pages.
(Continued)

*Primary Examiner* — Nicholas R Taylor
(74) *Attorney, Agent, or Firm* — CHIP LAW GROUP

(57) ABSTRACT

Managing the mobility of the edge servers includes detecting a trigger to a trigger to initiate management of a set of IoT devices via at least one first mobile edge server. A system obtains a set of attributes associated with each IoT device of the set of IoT devices and determines a weighting factor for each IoT device of the set of IoT devices. The system obtains a first set of spatial coordinates of each IoT device of the set of IoT devices and determines a first weighted centroid of the set of IoT devices based on the weighting factor and the first set of spatial coordinates. The system generates a deployment command to deploy the at least one first mobile edge server at the first weighted centroid.

20 Claims, 10 Drawing Sheets

(56) References Cited

OTHER PUBLICATIONS

Chen et al., "Preference-Aware Edge Server Placement in the Internet of Things", IEEE Internet of Things Journal, Jan. 15, 2022, pp. 1289-1299.
Deocarlo Guinzani, "System for detection and tracking of mobile object in a prototype autonomous land vehicle named GuinBOT", https://www.linkedin.com/pulse/system-detection-tracking-mobile-object-prototype-land-guinzani, Aug. 16, 2017, 5 pages.
Jeon et al., "Autonomous Aerial Dual-Target Following Among Obstacles", IEEE Access, Oct. 2021, 17 pages.
Jesse Young, "7 Best Follow Me Drones in 2025", https://www.droneguru.net/8-best-drones-that-follow-you-follow-drones/, Mar. 20, 2025, 35 pages.
No Author, "AWS Snowball", https://aws.amazon.com/snowball/, dated May 8, 2025, 5 pages.
No Author, "Edge Computing Solutions", https://www.ibm.com/edge-computing, dated May 9, 2025, 4 pages.
No Author, "IBM Security Services for SASE", https://web.archive.org/web/20230328011640/https://www.ibm.com/services/secure-access-service-edge, dated May 9, 2025, 8 pages.
No Author, "IoT solutions", https://www.ibm.com/cloud/internet-of-things, dated May 9, 2025, 6 pages.
No Author, "LoRa", https://en.wikipedia.org/wiki/LoRa, May 7, 2025, 7 pages.
No Author, "Underwater Wi-Fi Connection", https://community.gopro.com/s/article/Underwater-Wi-Fi-Connection?language=en_US, Dec. 12, 2023, 2 pages.
Rahman et al., "An Online Algorithm for Computation Offloading in Non-Stationary Environments", arXiv:2006.12032 [eess. SP], Jun. 22, 2020, 5 pages.
Zhang et al., "A Density-Based Offloading Strategy for IoT Devices in Edge Computing Systems", IEEE Access, Nov. 2018, 12 pages.

* cited by examiner

MOBILITY MANAGEMENT OF EDGE SERVERS IN A COMPUTING ENVIRONMENT

BACKGROUND

The disclosure relates to servers and more particularly, to edge servers.

With the advancements in technology, edge servers at a far edge are used to collect and process data from Internet of Things (IoT) devices. The edge servers are placed in proximity to the IoT devices, which helps them gather and process data quickly. Since the edge servers are in proximity to the IoT devices, the time it takes for data to travel between the IoT devices, and the edge servers is short. This enables the development of applications capable of responding with near-instantaneous speed, which is used in areas such as smart home automation, connected vehicles, and healthcare systems.

By processing data closer to its point of origin, the edge servers reduce latency and enhance the overall speed and efficiency of operations. Further, the edge servers minimize the volume of data that needs to be transmitted to centralized cloud servers, thereby optimizing both time and resource utilization. This architecture is particularly advantageous for applications requiring rapid response times, such as traffic management systems, industrial automation, and wearable health monitoring devices. By leveraging the edge servers, the applications can operate with greater efficiency and reliability, establishing them as a useful component of contemporary technological infrastructure.

SUMMARY

In various embodiments of the disclosure, a computer-implemented method for managing the mobility of edge servers is described. The computer-implemented method includes detecting a trigger to initiate management of a set of Internet of Things (IoT) devices via at least one first mobile edge server. The at least one first mobile edge server is configured to manage the set of IoT devices during an execution of an operational activity by the set of IoT devices. The computer-implemented method further includes obtaining a set of attributes associated with each IoT device of the set of IoT devices based on the detecting of the trigger. Further, the computer-implemented method includes determining a weighting factor of each IoT device of the set of IoT devices based on the set of attributes. The computer-implemented method further includes obtaining a first set of spatial coordinates of each IoT device of the set of IoT devices based on the weighting factor. Each IoT device of the set of IoT devices follows the first set of spatial coordinates during the execution of the operational activity. The computer-implemented method also includes determining a first weighted centroid of the set of IoT devices based on the weighting factor and the first set of spatial coordinates. Further, the computer-implemented method includes generating a deployment command to deploy the at least one first mobile edge server at the first weighted centroid. The at least one first mobile edge server is deployed at the first weighted centroid for the management of the set of IoT devices.

In various embodiments of the disclosure, a computer system for managing mobility of edge servers is described. The computer system includes a processor set, one or more computer-readable storage media, and program instructions stored on the one or more computer-readable storage media. The program instructions executable by the processor set to cause the processor set to detect a trigger to initiate management of a set of Internet of Things (IoT) devices via at least one first mobile edge server. The at least one first mobile edge server is configured to manage the set of IoT devices during an execution of an operational activity by the set of IoT devices. The program instructions are executable by the processor set to cause the processor set to determine a weighting factor of each IoT device of the set of IoT devices based on the detecting of the trigger and a set of attributes of the set of IoT devices. Further, the program instructions executable by the processor set to cause the processor set to determine a first weighted centroid of the set of IoT devices based on the weighting factor and a first set of spatial coordinates of each IoT device of the set of IoT devices. The program instructions executable by the processor set to cause the processor set to generate a deployment command to deploy the at least one first mobile edge server at the first weighted centroid. The at least one first mobile edge server is deployed at the first weighted centroid to manage the set of IoT devices. The program instructions executable by the processor set to cause the processor set to monitor at least one of the set of attributes or the first set of spatial coordinates based on the deployment command. The monitoring of the at least one of the set of attributes or the first set of spatial coordinates is in a duration of the execution of the operational activity. Further, the program instructions executable by the processor set to cause the processor set to detect one or more updates in the at least one of the set of attributes or the first set of spatial coordinates based on the monitoring of the at least one of the set of attributes or the first set of spatial coordinates. The program instructions executable by the processor set to cause the processor set to determine a second weighted centroid of the set of IoT devices based on the first weighted centroid, the one or more updates, and the deployment command. Furthermore, the program instructions executable by the processor set to cause the processor set to update the deployment command based on the second weighted centroid. The program instructions executable by the processor set to cause the processor set to deploy the at least one first mobile edge server at the second weighted centroid based on the updated deployment command.

In various embodiments of the disclosure, a computer program product for managing mobility of edge servers is described. The computer program product includes one or more computer-readable storage medium and program instructions stored on the one or more computer-readable storage media to perform operations.

Additional technical features and benefits are realized through the techniques of the disclosure. Embodiments and aspects of the disclosure are described in detail herein and are considered a part of the claimed subject matter. For a better understanding, refer to the detailed description and the drawings.

BRIEF DESCRIPTION OF THE DRAWINGS

The following description will provide details of preferred embodiments with reference to the following figures wherein.

DETAILED DESCRIPTION

Figure 1:
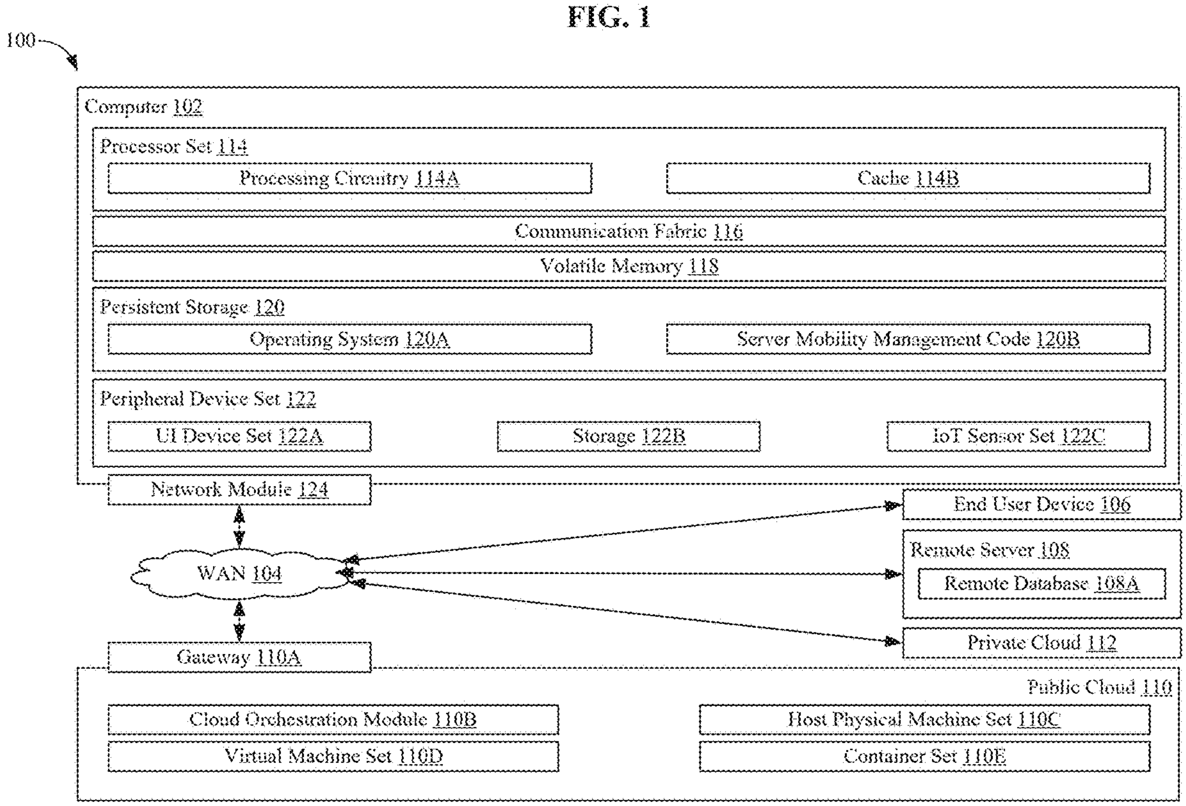
FIG. 1 is a diagram that illustrates a computing environment for managing the mobility of edge servers, in accordance with an embodiment of the disclosure.

The Internet of Things (IoT) has transformed industries by enabling real-time data collection, analysis, and decision-making using a set of IoT devices. However, traditional IoT systems rely heavily on static edge servers to process data generated by the set of IoT devices. While this approach works well in stationary environments, it faces significant challenges when the set of IoT devices is non-stationary and distributed over large areas in air, water, or land. This limitation can lead to latency, loss of connectivity, and inefficient data processing, particularly in dynamic and remote environments. To address these challenges, a mobile set of IoT devices seamlessly connects with non-stationary edge servers that can move alongside them in air, water, or land. By enabling mobile edge servers/non-stationary edge servers, low-latency communication, reliable connectivity, and real-time data processing are achieved in multiple environments, such as obstructed environments, underwater operations, and the like.

The reliance on the static edge servers creates multiple issues, especially in scenarios where the set of IoT devices are mobile or operate in remote, obstructed, or expansive environments. For example, in large areas such as agricultural farms spanning thousands of hectares, the set of IoT devices (e.g., sensors or devices on harvesting machines) are far away from stationary edge servers. This results in latency and poor connectivity, making it difficult to process data in real-time. Further, in underground mines, physical obstructions like soil, rock, and mine walls prevent network signals from reaching the set of IoT devices. For example, a camera mounted on a miner's helmet may fail to transmit live feed to the static edge servers for Artificial Intelligence (AI)-based danger detection due to lack of connectivity. Thus, it is impossible to detect and warn the miners of dangers in the mine. Further, machines in the mine may not have access to immediate data processing because they cannot connect to the static edge servers.

Further, in oil rig operations, underwater IoT devices (e.g., sensors or devices attached to workers or machines) fail to maintain connectivity with the static edge servers. This is because underwater communication is limited to a few meters, making real-time data collection and processing almost impossible. For example, underwater IoT devices, such as constructing or repairing equipment, may face challenges in connecting with the static edge servers due to limited connectivity, as network signals often cannot extend beyond a few meters underwater. These challenges collectively hinder real-time data processing, decision-making, and operational efficiency of the IoT devices in such environments.

To address the aforementioned challenges, the proposed system uses non-stationary edge servers that can move alongside the set of IoT devices in air, water, or land. The non-stationary edge servers ensure reliable connectivity by dynamically following the set of IoT devices, thereby reducing latency and enabling real-time data processing. For example, drones equipped with edge servers can provide seamless connectivity in agricultural fields, while autonomous robots or vehicles can serve as mobile edge servers in underground mines. Similarly, underwater drones or buoys can act as edge servers for the set of IoT devices in oil rig operations. By processing data locally and maintaining proximity to the set of IoT devices, the non-stationary edge servers overcome the limitations of static servers, ensuring efficient data collection, computation, and storage even in challenging environments. The proposed system approach enhances connectivity, reduces latency, and supports real-time decision-making, making it a transformative solution for dynamic and remote operations.

In various embodiments of the disclosure, a computer-implemented method for managing mobility of edge servers is described. The computer-implemented method includes detecting a trigger to initiate management of a set of Internet of Things (IoT) devices via at least one first mobile edge server. The at least one first mobile edge server is configured to manage the set of IoT devices during an execution of an operational activity by the set of IoT devices. The computer-implemented method further includes obtaining a set of attributes associated with each IoT device of the set of IoT devices based on the detecting of the trigger. Further, the computer-implemented method includes determining a weighting factor of each IoT device of the set of IoT devices based on the set of attributes. The computer-implemented method further includes obtaining a first set of spatial coordinates of each IoT device of the set of IoT devices based on the weighting factor. Each IoT device of the set of IoT devices follows the first set of spatial coordinates during the execution of the operational activity. The computer-implemented method also includes determining a first weighted centroid of the set of IoT devices based on the weighting factor and the first set of spatial coordinates. Further, the computer-implemented method includes generating a deployment command to deploy the at least one first mobile edge server at the first weighted centroid. The at least one first mobile edge server is deployed at the first weighted centroid for the management of the set of IoT devices.

In various embodiments of the disclosure, the set of attributes is selected from the group consisting of a priority of each IoT device of the set of IoT devices, a criticality level of each IoT device of the set of IoT devices, an operational relevance level of each IoT device of the set of IoT devices for a successful execution of the operational activity, latency needs of each IoT device of the set of IoT devices, a data generation rate of each IoT device of the set of IoT devices, a battery life of each IoT device of the set of IoT devices, a connectivity status of each IoT device of the set of IoT devices, environmental conditions in proximity of each IoT device of the set of IoT devices, a security level of each IoT device of the set of IoT devices, historical performance data of each IoT device of the set of IoT devices, compliance requirements of each IoT device of the set of IoT devices, one or more restricted areas defined for each IoT device of the set of IoT devices, or user-defined settings of each IoT device of the set of IoT devices.

In various embodiments of the disclosure, the computer-implemented method includes establishing a first communication session between the set of IoT devices and the at least one first mobile edge server using one or more communication processes.

In various embodiments of the disclosure, the computer-implemented method includes monitoring at least one of the set of attributes or the first set of spatial coordinates based on the deployment command. The monitoring of the at least one of the set of attributes or the first set of spatial coordinates is in a duration of the execution of the operational activity. Further, the computer-implemented method includes detecting one or more updates in the at least one of the set of attributes or the first set of spatial coordinates based on the monitoring of the at least one of the set of attributes or the first set of spatial coordinates. The computer-implemented method includes determining a second weighted centroid of the set of IoT devices based on the first weighted centroid, the one or more updates, and the deployment command. Furthermore, the computer-implemented method includes updating the deployment command based on the second weighted centroid. Further, the computer-implemented method includes deploying the at least one first mobile edge server at the second weighted centroid based on the updated deployment command.

In various embodiments of the disclosure, the computer-implemented method includes determining one or more management tasks associated with the at least one first mobile edge server based on the deployment command, the first weighted centroid, and one or more operational parameters associated with the operational activity. The computer-implemented method includes determining a first compute power for executing the one or more management tasks. Further, the computer-implemented method includes determining a second compute power of the at least one first mobile edge server based on the determination of the first compute power. The computer-implemented method includes comparing the second compute power with the first compute power. Furthermore, the computer-implemented method includes determining that the second compute power is less than the first compute power based on the comparing. The computer-implemented method includes detecting one or more second mobile edge servers based on one or more server parameters and the determination that the second compute power is less than the first compute power. The computer-implemented method also includes allocating the one or more management tasks to the at least one of the one or more second mobile edge servers or the at least one first mobile edge server.

In various embodiments of the disclosure, the computer-implemented method includes determining one or more integration mechanisms based on the allocation of the one or more management tasks. The determination of the one or more integration mechanisms is for integration of the at least one first mobile edge server with the one or more second mobile edge servers. The one or more integration mechanisms include at least one of a hanging operation, a pulling operation, a dragging operation, or a loading operation. The computer-implemented method includes generating an integration command based on the one or more integration mechanisms. The integration command is generated for the integration of the at least one first mobile edge server with the one or more second mobile edge servers. Furthermore, the computer-implemented method includes executing the integration command to integrate the at least one first mobile edge server with the one or more second mobile edge servers. The computer-implemented method includes executing the one or more management tasks based on the execution of the integration command.

In various embodiments of the disclosure, the one or more server parameters include at least one of an availability of the one or more second mobile edge servers, a distance between the at least one first mobile edge server and the one or more second mobile edge servers, a current load on the one or more second mobile edge servers, a processing power of the one or more second mobile edge servers, a network latency of the one or more second mobile edge servers, energy consumption by the one or more second mobile edge servers, or a geographical constraint of the one or more second mobile edge servers.

In various embodiments of the disclosure, the computer-implemented method includes monitoring the at least one first mobile edge server based on the generation of the deployment command. The monitoring of the at least one first mobile edge server is during the execution of the operational activity. The computer-implemented method includes detecting one or more replacement conditions based on the monitoring of the at least one first mobile edge server. The one or more replacement conditions are associated with replacing the at least one first mobile edge server with one or more third mobile edge servers. Further, the computer-implemented method includes detecting the one or more third mobile edge servers based on the one or more replacement conditions and the one or more server parameters associated with the one or more third mobile edge servers. The computer-implemented method includes establishing a second communication session between the at least one first mobile edge server and the one or more third mobile edge servers based on one or more communication processes and the detecting of the one or more third mobile edge servers. Furthermore, the computer-implemented method includes transmitting IoT data associated with the set of IoT devices from the at least one first mobile edge server to the one or more third mobile edge servers. The IoT data is transmitted to the one or more third mobile edge servers via the second communication session. The IoT data corresponds to data associated with the set of IoT devices collected by the at least one first mobile edge server. The computer-implemented method includes allocating the one or more management tasks to the one or more third mobile edge servers based on the transmitting of the IoT data.

In various embodiments of the disclosure, the one or more replacement conditions include at least one of an insufficient battery in the at least one first mobile edge server, insufficient fuel in the at least one first mobile edge server, a transition of the at least one first mobile edge server from a first medium to a second medium, overheating of the at least one first mobile edge server, hardware malfunction in the at least one first mobile edge server, network connectivity issues, a scheduled maintenance of the at least one first mobile edge server, or one or more environmental conditions in a vicinity of the at least one first mobile edge server.

In various embodiments of the disclosure, the computer-implemented method is implemented in the at least one first mobile edge server.

In various embodiments of the disclosure, the first weighted centroid corresponds to a second set of spatial coordinates within a proximity of the first set of spatial coordinates. The at least one first mobile edge server traverses on the second set of spatial coordinates to track the set of IoT devices.

In various embodiments of the disclosure, a computer system for managing mobility of edge servers is described. The computer system includes a processor set, one or more computer-readable storage media, and program instructions stored on one or more computer-readable storage media. The program instructions executable by the processor set to cause the processor set to detect a trigger to initiate management of a set of Internet of Things (IoT) devices via at least one first mobile edge server. The at least one first mobile edge server is configured to manage the set of IoT devices during an execution of an operational activity by the set of IoT devices. Further, the program instructions are executable by the processor set to cause the processor set to determine a weighting factor of each IoT device of the set of IoT devices based on the detecting of the trigger and a set of attributes of the set of IoT devices. The program instructions are executable by the processor set to cause the processor set to determine a first weighted centroid of the set of IoT devices based on the weighting factor and a first set of spatial coordinates of each IoT device of the set of IoT devices. Further, the program instructions executable by the processor set to cause the processor set to generate a deployment command to deploy the at least one first mobile edge server at the first weighted centroid. The at least one first mobile edge server is deployed at the first weighted centroid to manage the set of IoT devices. The program instructions executable by the processor set to cause the processor set to monitor at least one of the set of attributes or the first set of spatial coordinates based on the deployment command. The monitoring of the at least one of the set of attributes or the first set of spatial coordinates is in a duration of the execution of the operational activity. Furthermore, the program instructions executable by the processor set to cause the processor set to detect one or more updates in the at least one of the set of attributes or the first set of spatial coordinates based on the monitoring of the at least one of the set of attributes or the first set of spatial coordinates. The program instructions executable by the processor set to cause the processor set to determine a second weighted centroid of the set of IoT devices based on the first weighted centroid, the one or more updates, and the deployment command. Further, the program instructions executable by the processor set to cause the processor set to update the deployment command based on the second weighted centroid. The program instructions executable by the processor set to cause the processor set to deploy the at least one first mobile edge server at the second weighted centroid based on the updated deployment command.

In various embodiments of the disclosure, the set of attributes is selected from the group consisting of a priority of each IoT device of the set of IoT devices, a criticality level of each IoT device of the set of IoT devices, an operational relevance level of each IoT device of the set of IoT devices for a successful execution of the operational activity, latency needs of each IoT device of the set of IoT devices, a data generation rate of each IoT device of the set of IoT devices, a battery life of each IoT device of the set of IoT devices, a connectivity status of each IoT device of the set of IoT devices, environmental conditions in proximity of each IoT device of the set of IoT devices, a security level of each IoT device of the set of IoT devices, historical performance data of each IoT device of the set of IoT devices, compliance requirements of each IoT device of the set of IoT devices, one or more restricted areas defined for each IoT device of the set of IoT devices, or user-defined settings of each IoT device of the set of IoT devices.

In various embodiments of the disclosure, the program instructions executable by the processor set to establish a first communication session between the set of IoT devices and the at least one first mobile edge server via one or more communication processes.

In various embodiments of the disclosure, the program instructions executable by the processor set to cause the processor set to determine one or more management tasks associated with the at least one first mobile edge server based on the deployment command, the first weighted centroid, and one or more operational parameters associated with the operational activity. Further, the program instructions executable by the processor set to cause the processor set to determine a first compute power to execute the one or more management tasks. Furthermore, the program instructions executable by the processor set to cause the processor set to determine a second compute power of the at least one first mobile edge server based on the determination of the first compute power. The program instructions executable by the processor set to cause the processor set to compare the second compute power with the first compute power. Further, the program instructions executable by the processor set to cause the processor set to determine that the second compute power is less than the first compute power based on the comparing. The program instructions executable by the processor set to cause the processor set to detect one or more second mobile edge servers based on one or more server parameters and the determination that the second compute power is less than the first compute power. Furthermore, the program instructions executable by the processor set to cause the processor set to allocate the one or more management tasks to the at least one of the one or more second mobile edge servers or the at least one first mobile edge server.

In various embodiments of the disclosure, the program instructions executable by the processor set to cause the processor set to determine one or more integration mechanisms based on the allocation of the one or more management tasks. The determining of the one or more integration mechanisms is for integration of the at least one first mobile edge server with the one or more second mobile edge servers. The one or more integration mechanisms include at least one of a hanging operation, a pulling operation, a dragging operation, or a loading operation. Further, the program instructions executable by the processor set to cause the processor set to generate an integration command based on the one or more integration mechanisms. The integration command is generated for the integration of the at least one first mobile edge server with the one or more second mobile edge servers. The program instructions executable by the processor set to cause the processor set to execute the integration command to integrate the at least one first mobile edge server with the one or more second mobile edge servers. Furthermore, the program instructions executable by the processor set to cause the processor set to execute the one or more management tasks based on the execution of the integration command.

In various embodiments of the disclosure, the one or more server parameters include at least one of an availability of the one or more second mobile edge servers, a distance between the at least one first mobile edge server and the one or more second mobile edge servers, a current load on the one or more second mobile edge servers, a processing power of the one or more second mobile edge servers, a network latency of the one or more second mobile edge servers, energy consumption by the one or more second mobile edge servers, or a geographical constraint of the one or more second mobile edge servers.

In various embodiments of the disclosure, the program instructions executable by the processor set to cause the processor set to monitor the at least one first mobile edge server based on the updated deployment command. The at least one first mobile edge server is monitored for a duration of the execution of the operational activity. The program instructions executable by the processor set to cause the processor set to detect one or more replacement conditions based on the monitoring of the at least one first mobile edge server. The one or more replacement conditions are associated with replacement of the at least one first mobile edge server with one or more third mobile edge servers. Further, program instructions executable by the processor set to cause the processor set to detect the one or more third mobile edge servers based on the one or more replacement conditions and the one or more server parameters associated with the one or more third mobile edge servers. The program instructions executable by the processor set to cause the processor set to establish a second communication session between the at least one first mobile edge server and the one or more third mobile edge servers based on one or more communication processes and the detecting of the one or more third mobile edge servers. Furthermore, program instructions executable by the processor set to cause the processor set to transmit IoT data associated with the set of IoT devices from the at least one first mobile edge server to the one or more third mobile edge servers. The IoT data is transmitted to the one or more third mobile edge servers via the second communication session. Further, the IoT data corresponds to data associated with the set of IoT devices collected by the at least one first mobile edge server. The program instructions executable by the processor set to cause the processor set to allocate the one or more management tasks to the one or more third mobile edge servers based on the transmitting of the IoT data.

In various embodiments of the disclosure, the one or more replacement conditions include at least one of an insufficient battery in the at least one first mobile edge server, insufficient fuel in the at least one first mobile edge server, a transition of the at least one first mobile edge server from a first medium to a second medium, overheating of the at least one first mobile edge server, hardware malfunction in the at least one first mobile edge server, network connectivity issues, a scheduled maintenance of the at least one first mobile edge server, or one or more environmental conditions in a vicinity of the at least one first mobile edge server.

In various embodiments of the disclosure, a computer program product for managing mobility of edge servers is described. The computer program product includes one or more computer-readable storage medium and program instructions stored on the one or more computer-readable storage media to perform operations. The operation includes detecting a trigger to initiate management of a set of Internet of Things (IoT) devices via at least one first mobile edge server. The at least one first mobile edge server is configured to manage the set of IoT devices during an execution of an operational activity by the set of IoT devices. The operation further includes obtaining a set of attributes associated with each IoT device of the set of IoT devices based on the detecting of the trigger. Further, the operation includes determining a weighting factor of each IoT device of the set of IoT devices based on the set of attributes. The operation further includes obtaining a first set of spatial coordinates of each IoT device of the set of IoT devices based on the weighting factor. Each IoT device of the set of IoT devices follows the first set of spatial coordinates during the execution of the operational activity. The operation also includes determining a first weighted centroid of the set of IoT devices based on the weighting factor and the first set of spatial coordinates. Further, the operation includes generating a deployment command to deploy the at least one first mobile edge server at the first weighted centroid. The at least one first mobile edge server is deployed at the first weighted centroid for the management of the set of IoT devices.

Various aspects of the disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated operation, concurrently, or in a manner at least partially overlapping in time.

A computer program product embodiment ("CPP embodiment" or "CPP") is a term used in the disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium is an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the disclosure, is not to be construed as storage in the form of transitory signals per se, such as radio waves or freely propagating electromagnetic waves, electromagnetic waves propagating through a waveguide, light pulses passing through a fiber optic cable, electrical signals communicated through a wire, and/or additional transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

FIG. 1 is a diagram that illustrates a computing environment for managing the mobility of edge servers, in accordance with an embodiment of the disclosure. With reference to FIG. 1, there is shown a computing environment 100 that contains an example of an environment for the execution of at least some of the computer code involved in performing the disclosed methods, such as a server mobility management code 120B. In addition to the server mobility management code 120B, the computing environment 100 includes, for example, a computer 102, a wide area network (WAN) 104, an end user device (EUD) 106, a remote server 108, a public cloud 110, and a private cloud 112. In various embodiments of the disclosure, the computer 102 includes a processor set 114 (including a processing circuitry 114A and a cache 114B), a communication fabric 116, a volatile memory 118, a persistent storage 120 (including an operating system 120A and the server mobility management code 120B (as identified above)), a peripheral device set 122 (including a user interface (UI) device set 122A, a storage 122B, and an Internet of Things (IoT) sensor set 122C), and a network module 124. The remote server 108 includes a remote database 108A. The public cloud 110 includes a gateway 110A, a cloud orchestration module 110B, a host physical machine set 110C, a virtual machine set 110D, and a container set 110E.

The computer 102 may take the form of a desktop computer, a laptop computer, a tablet computer, a smartphone, a smartwatch or wearable computer, a mainframe computer, a quantum computer, or any form of a computer or a mobile device now known or to be developed in the future that is configured to run a program, accessing a network or querying a database, such as the remote database 108A. As is well understood in the art of computer technology, and depending upon the technology, the performance of a computer-implemented method may be distributed among multiple computers and/or between multiple locations. In this presentation of the computing environment 100, detailed discussion is focused on a single computer, specifically the computer 102, to keep the presentation as simple as possible. The computer 102 may be located in a cloud, even though it is not shown in a cloud in FIG. 1. The computer 102 is not required to be in a cloud except to any extent as may be affirmatively indicated.

The processor set 114 includes one, or more, computer processors of any type now known or to be developed in the future. The processing circuitry 114A may be distributed over multiple packages, for example, multiple, coordinated integrated circuit chips. The processing circuitry 114A may implement multiple processor threads and/or multiple processor cores. The cache 114B may be memory that is located in the processor chip package(s) and is typically used for data or code that should be available for rapid access by the threads or cores running on the processor set 114. Cache memories are typically organized into multiple levels depending upon relative proximity to the processing circuitry 114A. Alternatively, the cache 114B for the processor set 114 may be located "off-chip." In some computing environments, the processor set 114 may be designed for working with qubits and performing quantum computing.

Computer readable program instructions are typically loaded onto the computer 102 to cause a series of operations to be performed by the processor set 114 of the computer 102 and thereby affect a computer-implemented method, such that the instructions thus executed will instantiate the methods specified in flowcharts and/or narrative descriptions of computer-implemented methods included in this document (collectively referred to as "the disclosed methods"). These computer-readable program instructions are stored in various types of computer-readable storage media, such as the cache 114B and the storage media discussed below. The program instructions, and associated data, are accessed by the processor set 114 to control and direct the performance of the disclosed methods. In the computing environment 100, at least some of the instructions for performing the disclosed methods may be stored in the dynamic modification of the server mobility management code 120B in the persistent storage 120.

The communication fabric 116 is the signal conduction path that allows the various components of the computer 102 to communicate with each other. Typically, this fabric is made of switches and electrically conductive paths, such as the switches and electrically conductive paths that make up buses, bridges, physical input/output ports, and the like. Further, signal communication paths may be used, such as fiber optic communication paths and/or wireless communication paths.

The volatile memory 118 is any type of volatile memory now known or to be developed in the future. Examples include dynamic type random access memory (RAM) or static type RAM. Typically, the volatile memory 118 is characterized by a random access, but this is not required unless affirmatively indicated. In the computer 102, the volatile memory 118 is located in a single package and is internal to the computer 102, but alternatively or additionally, the volatile memory 118 may be distributed over multiple packages and/or located externally with respect to the computer 102.

The persistent storage 120 is any form of non-volatile storage for computers that is now known or to be developed in the future. The non-volatility of this storage means that the stored data is maintained regardless of whether power is being supplied to the computer 102 and/or directly to the persistent storage 120. The persistent storage 120 may be a read-only memory (ROM), but typically at least a portion of the persistent storage 120 allows the writing of data, deletion of data, and re-writing of data. Some familiar forms of the persistent storage 120 include magnetic disks and solid-state storage devices. The operating system 120A may take several forms, such as various known proprietary operating systems or open-source Portable Operating System Interface-type operating systems that employ a kernel. The code included in the server mobility management code 120B typically includes at least some of the computer code involved in performing the disclosed methods.

The peripheral device set 122 includes the set of peripheral devices of the computer 102. Data communication connections between the peripheral devices and the components of the computer 102 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments of the disclosure, the UI device set 122A may include components such as a display screen, speaker, microphone, wearable devices (such as goggles and smartwatches), keyboard, mouse, printer, touchpad, game controllers, and haptic devices. The storage 122B is external storage, such as an external hard drive, or insertable storage, such as an SD card. The storage 122B may be persistent and/or volatile. In various embodiments of the disclosure, the storage 122B may take the form of a quantum computing storage device for storing data in the form of qubits. In various embodiments of the disclosure where the computer 102 is required to have a large amount of storage (for example, where the computer 102 locally stores and manages a large database) then this storage may be provided by peripheral storage devices designed for storing very large amounts of data, such as a storage area network (SAN) that is shared by multiple, geographically distributed computers. The IoT sensor set 122C is made up of sensors that may be used in Internet of Things applications. For example, sensors may be a thermometer and a motion detector.

The network module 124 is the collection of computer software, hardware, and firmware that allows the computer 102 to communicate with computers through the WAN 104. The network module 124 may include hardware, such as modems or Wi-Fi signal transceivers, software for packetizing and/or de-packetizing data for communication network transmission, and/or web browser software for communicating data over the internet. In various embodiments of the disclosure, network control functions, and network forwarding functions of the network module 124 are performed on the same physical hardware device. In various embodiments of the disclosure (for example, embodiments that utilize software-defined networking (SDN)), the control functions and the forwarding functions of the network module 124 are performed on physically separate devices, such that the control functions manage several different network hardware devices. Computer-readable program instructions for performing the disclosed methods may typically be downloaded to the computer 102 from an external computer or external storage device through a network adapter card or network interface included in the network module 124.

The WAN 104 is any wide area network (for example, the internet) configured to communicate computer data over non-local distances by any technology for communicating computer data, now known or to be developed in the future. In various embodiments of the disclosure, the WAN 104 may be replaced and/or supplemented by local area networks (LANs) designed to communicate data between devices located in a local area, such as a Wi-Fi network. The WAN 104 and/or LANs typically include computer hardware such as copper transmission cables, optical transmission fibers, wireless transmission, routers, firewalls, switches, gateway computers, and edge servers.

The EUD 106 is any computer system that is used and controlled by an end user (for example, a customer of an enterprise that operates the computer 102) and may take any of the forms discussed above in connection with the computer 102. The EUD 106 typically receives helpful and useful data from the operations of the computer 102. For example, in a hypothetical case where the computer 102 is designed to provide a recommendation to an end user, this recommendation may typically be communicated from the network module 124 of the computer 102 through the WAN 104 to the EUD 106. In this way, the EUD 106 may display, or present recommendations to an end user. In various embodiments of the disclosure, the EUD 106 may be a client device, such as a thin client, a heavy client, a mainframe computer, a desktop computer, and so on.

The remote server 108 is any computer system that serves at least some data and/or functionality to the computer 102. The remote server 108 may be controlled and used by the same entity that operates the computer 102. The remote server 108 represents the machines that collect and store helpful and useful data for use by computers, such as the computer 102. For example, in a hypothetical case where the computer 102 is designed and programmed to provide a recommendation based on historical data, then this historical data may be provided to the computer 102 from the remote database 108A of the remote server 108.

The public cloud 110 is any computer system available for use by multiple entities that provides on-demand availability of computer system resources and/or computer capabilities, especially data storage (cloud storage) and computing power, without direct active management by the user. Cloud computing typically leverages the sharing of resources to achieve coherence and economies of scale. The direct and active management of the computing resources of the public cloud 110 is performed by the computer hardware and/or software of the cloud orchestration module 110B. The computing resources provided by the public cloud 110 are typically implemented by virtual computing environments that run on various computers making up the computers of the host physical machine set 110C, which is the universe of physical computers in and/or available to the public cloud 110. The virtual computing environments (VCEs) typically take the form of virtual machines from the virtual machine set 110D and/or containers from the container set 110E. It is understood that these VCEs may be stored as images and may be transferred among and between the various physical machine hosts, either as images or after the instantiation of the VCE. The cloud orchestration module 110B manages the transfer and storage of images, deploys new instantiations of VCEs, and manages active instantiations of VCE deployments. The gateway 110A is the collection of computer software, hardware, and firmware that allows the public cloud 110 to communicate through the WAN 104.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system may utilize resources of that computer, such as connected devices, files and folders, network shares, CPU power, and quantifiable hardware capabilities. However, programs running inside a container may only use the contents of the container and devices assigned to the container, a feature which is known as containerization.

The private cloud 112 may be similar to the public cloud 110, except that the computing resources are only available for use by a single enterprise. While the private cloud 112 is depicted as being in communication with the WAN 104, in various embodiments of the disclosure, a private cloud may be disconnected from the internet entirely and only accessible through a local/private network. A hybrid cloud is a composition of multiple clouds of different types (for example, private, community, or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment of the disclosure, the public cloud 110 and the private cloud 112 are both part of a larger hybrid cloud.

Figure 2:
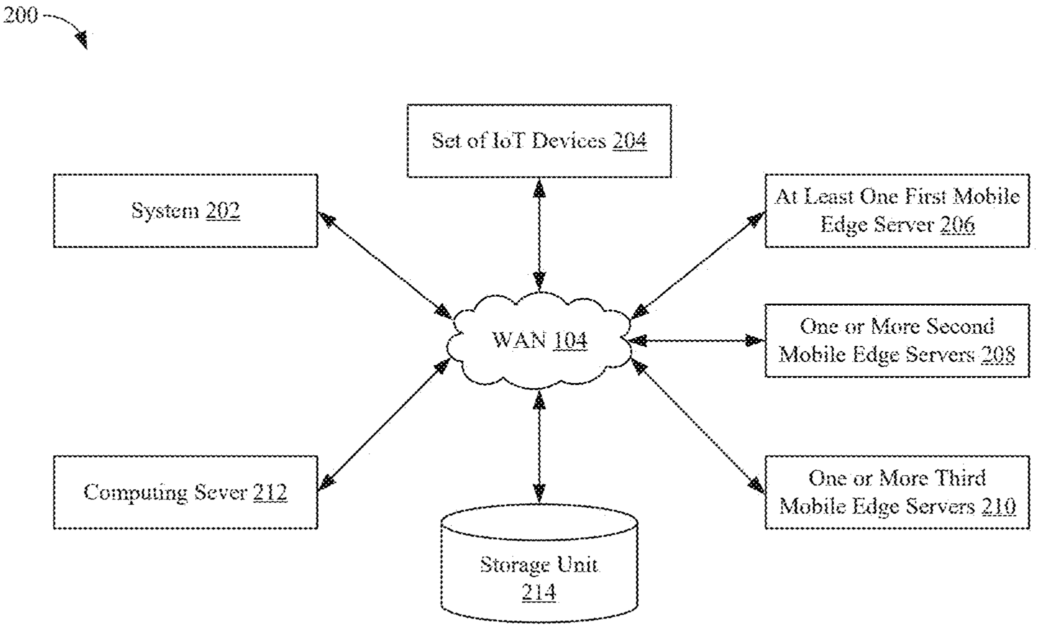
FIG. 2 is a diagram that illustrates a network environment for managing the mobility of edge servers, in accordance with an embodiment of the disclosure.

FIG. 2 is a diagram that illustrates a network environment for managing the mobility of edge servers, in accordance with an embodiment of the disclosure. FIG. 2 is explained in conjunction with elements from FIG. 1. With reference to FIG. 2, there is shown a diagram of a network environment 200. The network environment 200 includes a system 202, a set of Internet of Things (IoT) devices 204, at least one first mobile edge server 206, one or more second mobile edge servers 208, one or more third mobile edge servers 210, and a computing server 212. Further, the network environment 200 also includes a storage unit 214, such as an internal storage unit and an external storage unit. The network environment 200 further includes a WAN 104 of FIG. 1. In an embodiment of the disclosure, the system 202 is an exemplary embodiment of the computer 102 in FIG. 1.

The system 202 may include suitable logic, circuitry, interfaces, and/or code that is configured for managing the mobility of edge servers. In an embodiment of the disclosure, the edge servers are computing resources that are located closer to the end-users or IoT devices rather than in a centralized data center. Their primary purpose is to process data locally, thereby reducing latency and improving response times for applications and services. The system 202 is configured to address the challenges of managing IoT devices in dynamic and non-stationary environments by leveraging mobile edge servers that can adapt to the spatial distribution and operational needs of the devices. In an embodiment of the disclosure, the system 202 is configured to detect a trigger to initiate management of the set of IoT devices 204 via the at least one first mobile edge server 206. In an embodiment of the disclosure, the at least one first mobile edge server 206 is configured to manage the set of IoT devices 204 during an execution of an operational activity by the set of IoT devices 204. For example, the set of IoT devices 204 may include smart home devices, such as smart thermostats and security systems allowing homeowners to monitor and control their environments remotely, optimizing energy use and enhancing security. Further, the operational activity corresponds to tasks or processes that the set of IoT devices 204 are designed to perform as part of their intended function. The operational activity is goal-oriented and involves the execution of coordinated actions by the set of IoT devices 204 to achieve an outcome. For example, in a smart factory, the operational activity may involve the set of IoT devices 204 such as sensors, robotic arms, and conveyor belts working together to assemble products. Similarly, in a logistics setting, the operational activity may involve the set of IoT devices 204 like Global Positioning System (GPS) trackers and automated vehicles coordinating to optimize delivery routes.

Once the trigger is detected, the system 202 obtains a set of attributes of each IoT device of the set of IoT devices 204, such as a location of each IoT device of the set of IoT devices 204, and a priority of each IoT device of the set of IoT devices 204. Based on the set of attributes, the system 202 calculates a weighting factor for each IoT device of the set of IoT devices 204. In an embodiment of the disclosure, the weighting factor quantifies the operational significance of each IoT device within the set of IoT devices 204 for the execution of the operational activity. For example, if some IoT devices in the set of IoT devices 204 are more critical to the execution of the operational activity (e.g., IoT devices perform key tasks or have higher processing power than regular IoT devices), they may be assigned higher weighting factors. This ensures that the positions and roles of each IoT device of the set of IoT devices 204 are considered during the execution of the operational activity. Using the weighting factor, the system 202 obtains the first set of spatial coordinates of each IoT device of the set of IoT devices 204, ensuring that the set of IoT devices 204 follows the first set of spatial coordinates during the execution of the operational activity.

Further, the system 202 determines a first weighted centroid of the set of IoT devices 204 based on the weighting factor and the first set of spatial coordinates. In an embodiment of the disclosure, the first weighted centroid of the set of IoT devices 204 corresponds to a calculated central point that represents the spatial distribution of the set of IoT devices 204, taking into account their respective weighting factors. Furthermore, the system 202 generates a deployment command to deploy the at least one first mobile edge server 206 at the first weighted centroid. By deploying the at least one first mobile edge server 206 at the first weighted centroid, the at least one first mobile edge server 206 can effectively manage the set of IoT devices 204, ensuring low latency, reliable connectivity, and efficient data processing during the execution of the operational activity. Since the first weighted centroid is the central point for the management of the set of IoT devices 204, taking into account their respective weighted factors, relative importance and positions, hence the system 202 ensures that the at least first mobile edge server 206 is positioned at the first weighted centroid to minimize latency and maximize performance of the set of IoT devices 204. For example, in a smart city, the weighted centroid may indicate the central position of a congested area for a mobile edge server to coordinate traffic lights and cameras in the congested area. For example, in a smart agriculture system, a mobile edge server may be deployed to a central location in the field to process data from soil sensors and irrigation systems. In a disaster response scenario, the mobile edge server may be deployed to a central location to coordinate drones and sensors for search-and-rescue operations. This method is particularly useful in scenarios where the set of IoT devices 204 is non-stationary, such as in agriculture, mining, or underwater operations, as it dynamically adapts to the changing spatial and operational requirements of the devices.

In an embodiment of the disclosure, each of the set of IoT devices 204, at least one first mobile edge server 206, one or more second mobile edge servers 208, one or more third mobile edge servers 210, the computing server 212, and the storage unit 214 is connected independently to the system 202 using the WAN 104, such as 5G, 6G, and future wireless networks. This individual connectivity performs seamless and efficient data exchange between the system 202 and each of the set of IoT devices 204, at least one first mobile edge server 206, one or more second mobile edge servers 208, one or more third mobile edge servers 210, the computing server 212, and the storage unit 214, allowing for real-time communication and the timely management of edge servers. By leveraging advanced wireless technologies such as 5G, 6G, and future networks, the system 202 can accommodate data throughput, ensuring that mobility management of edge servers is executed without delay resulting in reliability.

In an embodiment of the disclosure, the system 202 is implemented in the computing server 212. In an embodiment of the disclosure, the computer-implemented method is implemented in at least one of the at least one first mobile edge server, the one or more second mobile edge servers, or the one or more third mobile edge servers 210.

In an embodiment of the disclosure, the computing server 212 is implemented as a cloud server and may execute operations through web applications, cloud applications, HTTP requests, repository operations, file transfer, and the like. Further, exemplary implementations of the computing server 212 include, but are not limited to, a database server, a file server, a web server, a media server, an application server, a mainframe server, or a cloud computing server.

In an embodiment of the disclosure, the computing server 212 is implemented as a plurality of distributed cloud-based resources by use of several technologies that are well known to those ordinarily skilled in the art. A person with ordinary skill in the art will understand that the scope of the disclosure may not be limited to the implementation of the computing server 212 and the system 202 as two separate entities. In certain embodiments, the functionalities of the computing server 212 can be incorporated in its entirety or at least partially in the system 202, without a departure from the scope of the disclosure.

In an embodiment of the disclosure, the storage unit 214 is configured to store an organized collection of data. The organized collection of data can be accessed electronically from a computer system (such as the system 202). For example, the storage unit 214 securely stores the set of attributes, the first set of spatial coordinates, and the deployment command. In an embodiment of the disclosure, the storage unit 214 is communicatively coupled to the system 202 via the WAN 104. By leveraging the storage unit 214, the system 202 may be able to manage larger volumes of data effectively. Further, the storage unit 214 is designed to manage, store, retrieve, and update data efficiently. The structure of the storage unit 214 involves tables, records, and fields that can be managed through various database management systems (DBMS). Examples of the storage unit 214 unit may include, but are not limited to, a relational database, a Non-Structured Query Language (SQL) database, a hierarchical database, a network database, a transactional database, a data warehouse, a distributed database, and a data lake.

Further, the at least one first mobile edge server 206 corresponds to primary mobile edge servers that are directly responsible for the management of the set of IoT devices 204 during the execution of the operational activity. Further, the one or more second mobile edge servers 208 are additional edge servers that can be identified and utilized when the compute power or resources of the at least one first mobile edge server 206 are insufficient to handle one or more management tasks. The one or more second mobile edge servers 208 are integrated with the at least one first mobile edge server 206 to share the workload and ensure seamless operation. Furthermore, the one or more third mobile edge servers 210 are replacement servers that come into play when the at least one first mobile edge server 206 needs to be replaced due to certain conditions, such as resource depletion or failure. The one or more third mobile edge servers 210 take over the one or more management tasks and responsibilities of the at least one first mobile edge server 206, ensuring continuity in operations and maintaining the performance of the IoT system. In an embodiment of the disclosure, the one or more management tasks correspond to the computational and operational responsibilities assigned to mobile edge servers to ensure the smooth functioning of the IoT system. For example, the one or more management tasks may include processing IoT data, managing communication sessions, monitoring server performance, allocating resources, and executing commands related to the deployment and integration of the mobile edge servers. Details on the at least one first mobile edge server 206, the one or more second mobile edge servers 208, and the one or more third mobile edge servers 210 are provided, for example, in FIG. 3.

In operation, the system 202 is configured to manage the set of IoT devices 204 using the at least one first mobile edge server 206. The operation begins with the detection of the trigger which signals the need to initiate the management of the set of IoT devices 204. For example, the trigger may be an event such as a sudden increase in data traffic from the set of IoT devices 204 or a scheduled operational activity requiring coordination among the set of devices. Once the trigger is detected, the system 202 is configured to obtain the set of attributes associated with each IoT device of the set of devices. For example, the set of attributes may include the battery level of each IoT device of the set of devices, a processing power of each IoT device of the set of devices, and the like. For instance, in a smart agriculture scenario, the set of attributes may include soil moisture levels, temperature readings, or the energy status of the set of IoT sensors deployed across a field. Using the set of attributes, the system 202 is configured to determine the weighting factor for each IoT device of the set of devices. The weighting factor reflects the relative importance or priority of each IoT device of the set of IoT devices 204 in the context of the operational activity. For example, a sensor with a low battery may be assigned a lower weighting factor to conserve its energy, while a sensor providing critical data might receive a higher weighting factor.

Further, the system 202 is configured to obtain the first set of spatial coordinates for each IoT device of the set of IoT devices 204, which represents their physical locations. The first set of spatial coordinates, combined with the weighting factors, are used to calculate a first weighted centroid (e.g., a central point that represents the distribution of the set of IoT devices 204 based on the importance and the location of the set of IoT devices 204). For example, in a warehouse setting, the weighted centroid may represent a location for deploying a mobile edge server to manage IoT devices like robotic arms or inventory trackers. Further, the system 202 generates the deployment command to deploy the at least one first mobile edge server 206 at the weighted centroid. For example, in a disaster response scenario, the mobile edge server may be deployed to a central location to coordinate the set of IoT devices 204 like drones, sensors, and communication nodes, ensuring seamless operation and data processing.

Figure 3:
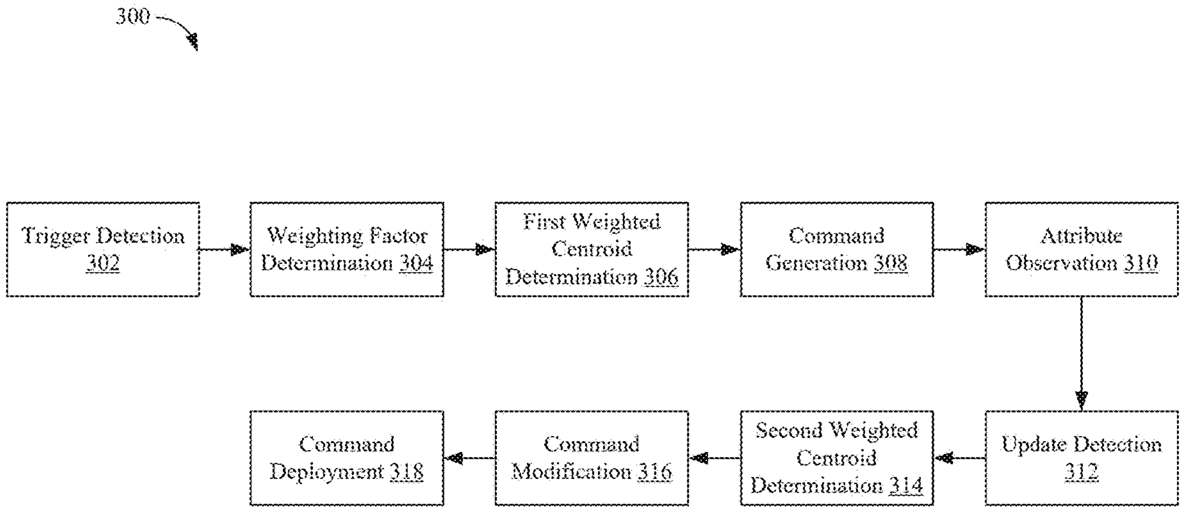
FIG. 3 is a diagram that illustrates exemplary operations of a system for managing the mobility of the edge servers, in accordance with an embodiment of the disclosure.

FIG. 3 is a diagram that illustrates exemplary operations of a system 202 for managing mobility of edge servers, in accordance with an embodiment of the disclosure. FIG. 3 is explained in conjunction with elements from FIG. 1 and FIG. 2. With reference to FIG. 3, there is shown a block diagram 300 that illustrates exemplary operations from 302 to 318, as described herein. The exemplary operations illustrated in the block diagram 300 start at 302 and are performed by any computing system, apparatus, or device, such as by the computer 102 of FIG. 1 or system 202 of FIG. 2. Although illustrated with discrete blocks, the exemplary operations associated with one or more blocks of the block diagram 300 are divided into additional blocks, combined into fewer blocks, or eliminated, depending on the particular implementation.

At 302, a trigger detection operation is executed. In the trigger detection operation, the system 202 is configured to detect the trigger to initiate management of the set of IoT devices 204 via the at least one first mobile edge server 206. In an embodiment of the disclosure, the at least one first mobile edge server 206 is configured to manage the set of IoT devices 204 during an execution of the operational activity by the set of IoT devices 204. For example, the trigger may be an external event, a system condition, or a scheduled activity. For example, in a smart home, a trigger may be the detection of motion in a room, prompting the set of IoT devices 204 like lights, cameras, and thermostats to activate. In a smart factory, a trigger may be the start of a production cycle, requiring the set of IoT devices 204 like robotic arms and sensors to coordinate their operations.

Further, the system 202 is configured to obtain the set of attributes associated with each IoT device of the set of IoT devices 204 based on the detection of the trigger. For example, the set of attributes includes at least one of a priority of each IoT device of the set of IoT devices 204, a criticality level of each IoT device of the set of IoT devices 204, an operational relevance level of each IoT device of the set of IoT devices 204 for a successful execution of the operational activity, latency needs of each IoT device of the set of IoT devices 204, a data generation rate of each IoT device of the set of IoT devices 204, a battery life of each IoT device of the set of IoT devices 204, a connectivity status of each IoT device of the set of IoT devices 204, environmental conditions in proximity of each IoT device of the set of IoT devices 204, a security level of each IoT device of the set of IoT devices 204, historical performance data of each IoT device of the set of IoT devices 204, compliance requirements of each IoT device of the set of IoT devices 204, one or more restricted areas defined for each IoT device of the set of IoT devices 204, or user-defined settings of each IoT device of the set of IoT devices 204. In an embodiment of the disclosure, the priority of each IoT device of the set of IoT devices 204 corresponds to the relative importance of an IoT device in the context of the operational activity. IoT devices with priority are critical to the success of the task and may require more resources or attention. Further, the criticality level of each IoT device of the set of IoT devices 204 indicates how critical a device is for the overall system's functionality or the operational activity. The operational relevance level of each IoT device of the set of IoT devices 204 measures how IoT devices may contribute directly to the task or may play a supporting role. For example, in a drone delivery system, the drone has operational relevance, while a weather sensor providing environmental data has moderate relevance. Further, the user-defined settings are custom configurations set by the user to control the behavior of an IoT device. For example, a user may set a smart light to turn on only during specific hours or when motion is detected.

At 304, a weighting factor determination operation is executed. In the weighting factor determination operation, the system 202 is configured to determine the weighting factor of each IoT device of the set of IoT devices 204 based on the set of attributes of the set of IoT devices 204. In an embodiment of the disclosure, the weighting factor represents a relative priority of each IoT device of the set of IoT devices 204 in the context of the operational activity. For example, an IoT device providing critical data, such as a sensor detecting hazardous gas levels, may receive a higher weighting factor as compared to regular IoT devices. The weighting factor ensures that the system 202 prioritizes the set of IoT devices 204 based on their relevance and capabilities, enabling efficient resource allocation and task execution.

In an embodiment of the disclosure, the system 202 is configured to obtain the first set of spatial coordinates of each IoT device of the set of IoT devices 204 based on the weighting factor. Further, each IoT device of the set of IoT devices 204 follows the first set of spatial coordinates during the execution of the operational activity. The first set of spatial coordinates represents the physical locations of the set of IoT devices 204. For example, in a warehouse, the first set of spatial coordinates may indicate the positions of the set of IoT devices 204, such as robotic arms, inventory trackers, and cameras.

At 306, a first weighted centroid determination operation is executed. In the first weighted centroid determination operation, the system 202 is configured to determine the first weighted centroid of the set of IoT devices 204 based on the weighting factor and the first set of spatial coordinates. In an embodiment of the disclosure, the first weighted centroid corresponds to a second set of spatial coordinates within a proximity of the first set of spatial coordinates. In an embodiment of the disclosure, the at least one first mobile edge server 206 traverses on the second set of spatial coordinates to track the set of IoT devices 204. For example, in a smart city, the weighted centroid may indicate the best position for a mobile edge server to coordinate traffic lights and cameras in a congested area.

At 308, a command generation operation is executed. In the command generation operation, the system 202 is configured to generate the deployment command to deploy the at least one first mobile edge server 206 at the first weighted centroid. In an embodiment of the disclosure, the at least one first mobile edge server 206 is deployed at the first weighted centroid for the management of the set of IoT devices 204. For example, in a smart agriculture system, a mobile edge server may be deployed to a central location in the field to process data from soil sensors and irrigation systems. In a disaster response scenario, the mobile edge server may be deployed to a central location to coordinate drones and sensors for search-and-rescue operations. The system 202 continuously recalculates the weighted centroid of the set of IoT devices 204 as the attributes or positions of the set of IoT devices 204 change. As a result, the at least one first mobile edge server 206 is dynamically repositioned to the updated weighted centroid. In an embodiment of the disclosure, the system 202 is configured to establish a first communication session between the set of IoT devices 204 and the at least one first mobile edge server 206 using one or more communication processes. The first communication session is established based on deploying the at least one first mobile edge server 206 at the first weighted centroid. For example, the one or more communication processes include Long Range (LoRa), Message Queuing Telemetry Transport (MQTT), Representational State Transfer (REST), and the like. The one or more communication processes facilitate the computation, collection, and storage of IoT data collected by the first set of IoT devices 204, ensuring seamless interaction between the set of IoT devices 204 and the at least one first mobile edge server 206. Details on deploying the at least one first mobile edge server 206 at the first weighted centroid are provided, for example, in FIG. 4 and FIG. 6

In an embodiment of the disclosure, the system 202 is configured to determine a centroid of the set of IoT devices 204. Further, the system 202 is configured to generate the deployment command to deploy the at least one first mobile edge server 206 at the centroid. In an embodiment of the disclosure, the at least one first mobile edge server 206 continuously recalculates the centroid of the set of IoT devices 204 as the position of the set of IoT devices 204 keeps updating. The at least one first mobile edge server 206 dynamically adjusts its position to align with the recalculated centroid of the set of IoT devices 204. This ensures that the at least one first mobile edge server 206 remains positioned relative to the first set of IoT devices 204. In an embodiment of the disclosure, the system 202 is configured to establish the first communication session between the set of IoT devices 204 and the at least one first mobile edge server 206 using the one or more communication processes. Details on deploying the at least one first mobile edge server 206 at the centroid are provided, for example, in FIG. 4 and further explained in FIG. 5.

At 310, an attribute observation operation is executed. In the attribute observation operation, the system 202 is configured to monitor at least one of the set of attributes or the first set of spatial coordinates based on the deployment command. In an embodiment of the disclosure, the monitoring of the at least one of the set of attributes or the first set of spatial coordinates is in a duration of the execution of the operational activity. This monitoring ensures that the system 202 remains aware of any changes that could impact the management of the set of IoT devices 204. For example, if an IoT device moves to a new location or its battery level drops significantly, the system 202 detects these changes.

At 312, an update detection operation is executed. In the update detection operation, the system 202 is configured to one or more updates in the at least one of the set of attributes or the first set of spatial coordinates based on the monitoring of the at least one of the set of attributes or the first set of spatial coordinates. For example, the one or more updates include an IoT device moving to a new location, a change in environmental conditions affecting the IoT device, a change in connectivity status of the IoT device (e.g., losing network access), and the like.

At 314, a second weighted centroid determination operation is executed. In the second weighted centroid determination operation, the system 202 is configured to determine a second weighted centroid of the set of IoT devices 204 based on the first weighted centroid, the one or more updates, and the deployment command. In an embodiment of the disclosure, the second weighted centroid indicates changes in the attributes or positions of the set of IoT devices 204 and ensures that the at least one first mobile edge server 206 remains positioned to manage the set of IoT devices 204. For example, if several IoT devices move to a new area, the second weighted centroid may shift closer to their new location.

At 316, a command modification operation is executed. In the command modification operation, the system 202 is configured to update the deployment command based on the second weighted centroid. This ensures that the at least one first mobile edge server 206 is repositioned to maintain efficient management of the set of IoT devices 204.

At 318, a command deployment operation is executed. In the command deployment operation, the system 202 is configured to deploy the at least one first mobile edge server 206 at the second weighted centroid based on the updated deployment command. This dynamic repositioning ensures that the server continues to manage the set of IoT devices 204 effectively, even as their attributes or spatial positions change during the operational activity.

Further, the system 202 is configured to determine one or more management tasks associated with the at least one first mobile edge server 206 based on the deployment command, the first weighted centroid, and one or more operational parameters associated with the operational activity. In an embodiment of the disclosure, the one or more management tasks correspond to specific activities or responsibilities that the at least one first mobile edge server 206 may perform to effectively manage the set of IoT devices 204 during the execution of the operational activity. For example, the one or more management tasks may include monitoring and controlling the set of IoT devices 204, managing compute, storage, and network resources to optimize the performance of the set of IoT devices 204, ensuring security of the set of IoT devices 204, and the like. For example, if the operational activity involves real-time video processing from IoT cameras, the one or more management tasks may include video data compression, analysis, and forwarding to a central server. For example, the one or more operational parameters may include latency requirements, data processing needs, and the nature of the operational activity (e.g., real-time monitoring, data aggregation, or device coordination).

Further, the system 202 is configured to determine a first compute power (e.g., (Central Processing Unit (CPU), Graphics Processing Unit (GPU), memory, and the like) for executing the one or more management tasks. In an embodiment of the disclosure, the first compute power corresponds to the computational resources (e.g., processing power, memory, and storage) required to execute the one or more management tasks associated with the at least one first mobile edge server 206. The first compute power is determined based on factors such as the complexity of the one or more management tasks, the number of set of IoT devices 204 being managed, the data processing needs, and the like. Furthermore, the system 202 is configured to determine a second compute power of the at least one first mobile edge server 206 based on the determination of the first compute power. In an embodiment of the disclosure, the second compute power corresponds to the actual computational capacity available on the at least one first mobile edge server 206 at the time of deployment.

Furthermore, the system 202 is configured to compare the second compute power with the first compute power. The system 202 is configured to determine that the second compute power is less than the first compute power based on the comparing. The system 202 is configured to detect one or more second mobile edge servers 208 based on one or more server parameters and the determination that the second compute power is less than the first compute power. For example, the one or more server parameters include at least one of an availability of the one or more second mobile edge servers, a distance between the at least one first mobile edge server 206 and the one or more second mobile edge servers, a current load on the one or more second mobile edge servers, a processing power of the one or more second mobile edge servers, a network latency of the one or more second mobile edge servers, energy consumption by the one or more second mobile edge servers, or a geographical constraint of the one or more second mobile edge servers. For example, if the first mobile edge server is overloaded, the system 202 may identify nearby mobile edge servers with idle resources to share the workload. The system 202 is configured to allocate the one or more management tasks to the at least one of the one or more second mobile edge servers or the at least one first mobile edge server 206. This allocation ensures that the one or more management tasks are executed efficiently without overloading any single mobile edge server. For example, the system 202 allocates the one or more management tasks to k nearest neighboring mobile edge servers (e.g., the one or more second mobile edge servers), which are within a specified distance D and are available to accept the one or more management tasks from the at least one first mobile edge server 206. For example, if the first mobile edge server can handle 70% of the tasks, the remaining 30% may be allocated to a second mobile edge server. In an embodiment of the disclosure, the distance between the at least one first mobile edge server 206 and the one or more second mobile edge servers 208 is DHA.

For example, when the at least one first mobile edge server 206 approaches the limit of its computing capacity due to increased workload, the at least one first mobile edge server 206 can automatically request the one or more second mobile edge servers 208 to act as worker servers. These worker servers are available within a provisioning zone. The at least one first mobile edge server 206 initiates the request for the one or more second mobile edge servers 208 to manage the increased load. During the provisioning process, the provisioning zone configures the one or more second mobile edge servers 208 with the live coordinates and configurations of the at least one first mobile edge server 206 to establish connections with the set of IoT devices 204 being followed and the at least one first mobile edge server 206. This autoscaling mechanism ensures efficient resource utilization and uninterrupted execution of the operational activity.

In an embodiment of the disclosure, the system 202 is configured to determine one or more integration mechanisms based on the allocation of the one or more management tasks. Further, the determining of the one or more integration mechanisms is for integration of the at least one first mobile edge server with the one or more second mobile edge servers. For example, the one or more integration mechanisms include at least one of a hanging operation, a pulling operation, a dragging operation, or a loading operation. In an embodiment of the disclosure, the one or more integration mechanisms describe how the at least one first mobile edge server 206 actively manipulates or positions the second mobile edge server to establish a physical connection. For example, in the hanging operation, the first mobile edge server suspends or attaches the second mobile edge server. In the pulling operation, the first mobile edge server physically pulls the second mobile edge server closer to establish a connection or alignment. In the dragging operation, the first mobile edge server moves the second mobile edge server into position by dragging it across a surface or infrastructure. Further, in the loading operation, the first mobile edge server places or mounts the second mobile edge server into a shared physical infrastructure, such as a rack or chassis.

Further, the system 202 is configured to generate an integration command based on the one or more integration mechanisms. In an embodiment of the disclosure, the integration command is generated for the integration of the at least one first mobile edge server 206 with the one or more second mobile edge servers. The integration command specifies the exact actions the first mobile edge server may perform (e.g., the hanging operation, the pulling operation, the dragging operation, or the loading operation) to integrate the second mobile edge server. Furthermore, the system 202 is configured to execute the integration command to integrate the at least one first mobile edge server 206 with the one or more second mobile edge servers. The system 202 is configured to execute the one or more management tasks based on the execution of the integration command. Details on the execution of the integration command are provided, for example, in FIG. 7.

Furthermore, the system 202 is configured to monitor the at least one first mobile edge server 206 based on the generation of the deployment command. In an embodiment of the disclosure, the monitoring of the at least one first mobile edge server 206 is during the execution of the operational activity. The system 202 is configured to detect one or more replacement conditions based on the monitoring of the at least one first mobile edge server 206. In an embodiment of the disclosure, the one or more replacement conditions are associated with replacing the at least one first mobile edge server 206 with one or more third mobile edge servers 210. For example, the one or more replacement conditions include at least one of an insufficient battery in the at least one first mobile edge server 206, insufficient fuel in the at least one first mobile edge server 206, a transition of the at least one first mobile edge server 206 from a first medium to a second medium, overheating of the at least one first mobile edge server 206, hardware malfunction in the at least one first mobile edge server 206, network connectivity issues, a scheduled maintenance of the at least one first mobile edge server 206, or one or more environmental conditions in a vicinity of the at least one first mobile edge server 206. For example, a drone serving as a mobile edge server has a lithium-polymer (LiPo) battery. If its charge drops below 20%, the system 202 detects this as an "insufficient battery" condition and initiates a replacement or recharging process. For example, a self-driving car acting as a mobile edge server is running on diesel. When its fuel tank level drops below 5 liters, the system 202 flags it as insufficient fuel and initiates a swap with another available mobile edge server. The "first medium" and "second medium" refer to the physical or operational environments in which the mobile edge server operates. The transition between the first medium and the second medium occurs when the at least one first mobile edge server 206 moves from a first type of environment to a second type of environment. For example, a mobile edge server transitioning from land (e.g., mounted on a vehicle) to water (e.g., mounted on a boat). For example, the one or more environmental conditions include weather conditions, physical obstructions, and the like.

Further, the system 202 is configured to detect the one or more third mobile edge servers 210 based on the one or more replacement conditions and the one or more server parameters associated with the one or more third mobile edge servers 210. The system 202 is configured to establish a second communication session between the at least one first mobile edge server 206 and the one or more third mobile edge servers 210 based on one or more communication processes and the detection of the one or more third mobile edge servers. Furthermore, the system 202 is configured to transmit IoT data associated with the set of IoT devices 204 from the at least one first mobile edge server 206 to the one or more third mobile edge servers 210. In an embodiment of the disclosure, the IoT data is transmitted to the one or more third mobile edge servers 210 via the second communication session. In an embodiment of the disclosure, the IoT data corresponds to data associated with the set of IoT devices 204 collected by the at least one first mobile edge server 206. The system 202 is configured to allocate the one or more management tasks to the one or more third mobile edge servers 210 based on the transmission of the IoT data. The IoT data is transmitted to the one or more third mobile edge servers 210, such that the one or more third mobile edge servers 210 can seamlessly continue performing the one or more management tasks previously handled by the at least one first mobile edge server 206. This ensures that the one or more management tasks remain uninterrupted, even when the at least one first mobile edge server 206 encounters issues like low battery or hardware malfunction.

In an embodiment of the disclosure, when the at least one first mobile edge server 206 is assigned to track and manage a single IoT device, a one-to-one mapping is established between the IoT device and the at least one first mobile edge server 206. The at least one first mobile edge server 206 maintains a specified distance D from the single IoT device and is capable of following the single IoT device across various environments, including air, water, underground, or land. In an embodiment of the disclosure, the target IoT device is connected to the at least one first mobile edge server 206 using the one or more communication processes.

In an embodiment of the disclosure, when it is required for the at least one first mobile edge server 206 to follow a path (e.g., a predefined path) or set of coordinates, the system 202 configures the path within the at least one first mobile edge server 206. The at least one first mobile edge server 206 is configured to follow the path while tracking the set of IoT devices 204. In an embodiment of the disclosure, at least one first mobile edge server 206 follows the path in a direction to ensure that the set of IoT devices 204 remains within a distance D from the at least one first mobile edge server 206. This approach allows the at least one first mobile edge server 206 to maintain positioning relative to the set of IoT devices 204 while following a path or route. Details on traversing the at least one first mobile edge server 206 at the path are provided, for example, in FIG. 7.

In an embodiment of the disclosure, the system 202 is configured to restrict the at least one first mobile edge server 206 from entering prohibited or restricted areas. The system 202 configures the at least one first mobile edge server 206 with a map or coordinates of the restricted zones. The at least one first mobile edge server 206 is programmed to avoid venturing into the restricted areas while performing the one or more management tasks. This configuration ensures that the at least one first mobile edge server 206 operates within permissible boundaries, adhering to geographical or operational constraints, while continuing to follow and manage the set of IoT devices 204.

Figure 4:
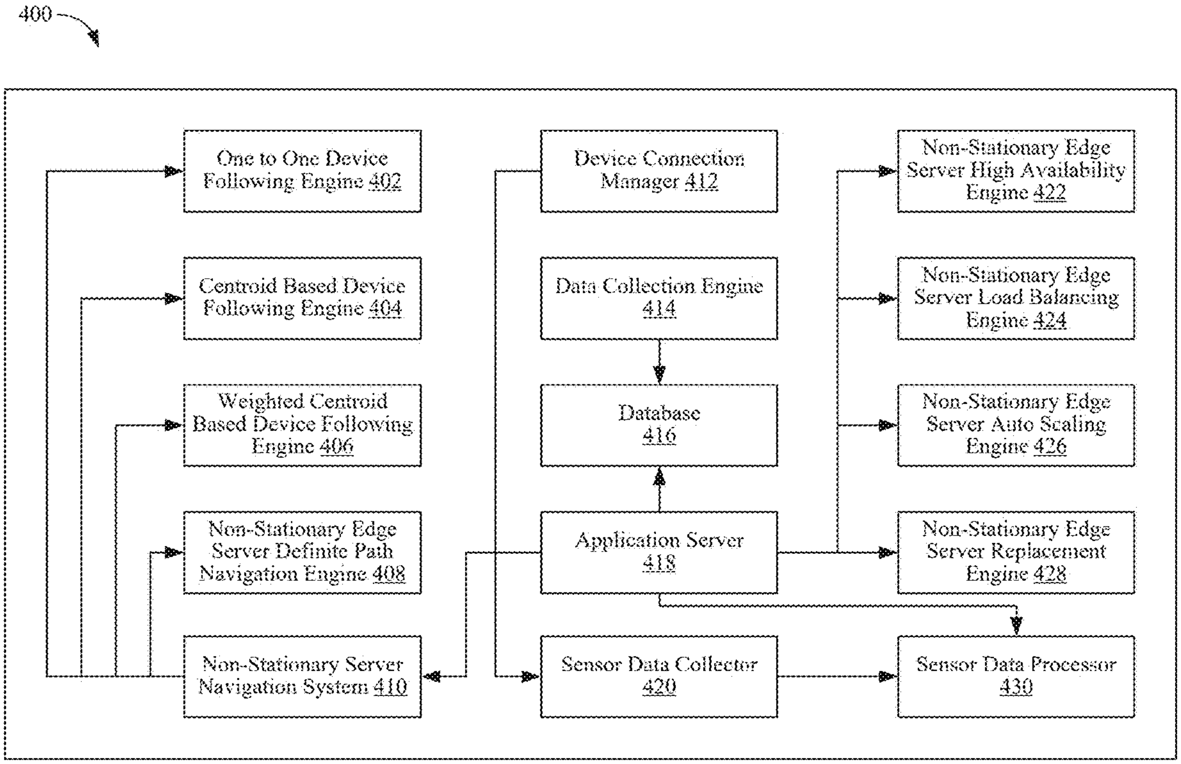
FIG. 4 is a diagram that illustrates components of the system for managing the mobility of the edge servers, in accordance with an embodiment of the disclosure.

FIG. 4 is a diagram that illustrates components of the system 202 for managing mobility of the edge servers, in accordance with an embodiment of the disclosure. FIG. 4 is explained in conjunction with elements from FIG. 1, FIG. 2, and FIG. 3.

As shown in diagram 400 of FIG. 4, the components of the system 202 include a one-to-one device following engine 402, a centroid based device following engine 404, a weighted centroid based device following engine 406, a non-stationary edge server definite path navigation engine 408, a non-stationary server navigation system 410, a device connection manager 412, a data collection engine 414, a database 416, an application server 418, a sensor data collector 420, a non-stationary edge server high availability engine 422, a non-stationary edge server load balancing engine 424, a non-stationary edge server auto scaling engine 426, a non-stationary edge server replacement engine 428, and a sensor data processor 430.

In an embodiment of the disclosure, the one-to-one device following engine 402 is configured to individually track and manage each IoT device of the set of IoT devices 204 using the at least one of the one or more second mobile edge servers 208, the one or more third mobile edge servers 210, or the at least one first mobile edge server 206. The one-to-one device following engine 402 is further configured to obtain the navigation and movement of the at least one first mobile edge server 206, the one or more second mobile edge servers 208, and the one or more third mobile edge servers 210, from the non-stationary server navigation system 410. The one-to-one device following engine 402 obtains the navigation and movement to individually track and manage each IoT device of the set of IoT devices 204. Further, the device connection manager 412 is configured to manage the connections between a set of IoT devices 204 and the at least one of the one or more second mobile edge servers 208, the one or more third mobile edge servers 210, or the at least one first mobile edge server 206. The device connection manager 412 determines if devices (e.g., the set of IoT devices 204) are properly connected and can communicate with the one or more second mobile edge servers 208, the one or more third mobile edge servers 210, or the at least one first mobile edge server 206.

Further, the non-stationary edge server high availability engine 422 is configured to manage the at least one first mobile edge server 206, the one or more second mobile edge servers 208, and the one or more third mobile edge servers 210, such that they remain operational and available while moving or in non-stationary positions. The non-stationary edge server high availability engine 422 is configured to manage the at least one first mobile edge server 206, the one or more second mobile edge servers 208, and the one or more third mobile edge servers 210 based on the data collected by the application server 418. The centroid based device following engine 404 calculates the centroid (geometric center) of the set of IoT devices 204 and ensures that the at least one first mobile edge server 206 follows this centroid. The centroid based device following engine 404 calculates the centroid (geometric center) of the set of IoT devices 204 by obtaining the navigation and movement of the at least one first mobile edge server 206, the one or more second mobile edge servers 208, and the one or more third mobile edge servers 210, from the non-stationary server navigation system 410. This helps in optimizing the position of the at least one first mobile edge server 206 relative to the set of IoT devices 204. Furthermore, the non-stationary edge server load balancing engine 424 is configured to distribute the workload among multiple mobile edge servers to ensure that no single server is overwhelmed, based on the data collected by the application server 418.

Furthermore, the weighted centroid based device following engine 406 is similar to the centroid based device following engine 404, but it takes into account weighting factors (such as device priority or criticality) to determine the position for the at least one first mobile edge server 206. The weighted centroid based device following engine 406 determines the position for the at least one first mobile edge server 206 based on the navigation and the movement of the at least one first mobile edge server 206, the one or more second mobile edge servers 208, and the one or more third mobile edge servers 210, which is managed by the stationary server navigation system 410. In an embodiment of the disclosure, the data collection engine 414 is configured to gather the data from devices (e.g., the at least one first mobile edge server 206, the one or more second mobile edge servers 208, the one or more third mobile edge servers 210, and the set of IoT devices 204). The database 416 is configured to store data collected from the set of IoT devices 204, the at least one first mobile edge server 206, the one or more second mobile edge servers 208, and the one or more third mobile edge servers 210, the application server 418 and the data collection engine 414. The non-stationary edge server auto scaling engine 426 automatically adjusts the number of mobile edge servers based on the current demand and workload for performing the operational activity based on the data collected from the application server 418.

Further, the non-stationary edge server definite path navigation engine 408 is configured to manage the at least one first mobile edge server 206, the one or more second mobile edge servers 208, and the one or more third mobile edge servers 210, such that they follow a specific path or route. The non-stationary edge server definite path navigation engine 408 manages the at least one first mobile edge server 206, the one or more second mobile edge servers 208, and the one or more third mobile edge servers 210 based on the navigation and the movement of the at least one first mobile edge server 206, the one or more second mobile edge servers 208, and the one or more third mobile edge servers 210, which is managed by the stationary server navigation system 410. The application server 418 hosts the applications and services that interact with the set of IoT devices 204, the at least one first mobile edge server 206, the one or more second mobile edge servers 208, and the one or more third mobile edge servers 210. The application server 418 further stores the data associated with the applications and the services that interact with the set of IoT devices 204. The data associated with applications and services interacting with set of IoT devices 204 includes quantitative measurements (such as temperature, humidity, light levels, or traffic volume), qualitative observations (such as user feedback or device status), and contextual information (such as timestamps and geographic locations), which are utilized to assess the performance, functionality, and operational efficiency of the set of IoT devices 204 and the services they support. For example, in a smart city traffic management application, the data may include real-time traffic flow measurements from connected sensors, historical traffic patterns, and environmental conditions, which can be used to assess the effectiveness of traffic management strategies and analyze the operations of traffic signals. Further, the non-stationary edge server replacement engine 428 is configured to manage the replacement of the at least one first mobile edge server 206, such as when a server fails or needs maintenance, based on the data collected by the application server 418.

Furthermore, the non-stationary server navigation system 410 is configured to manage the navigation and movement of the at least one first mobile edge server 206, the one or more second mobile edge servers 208, and the one or more third mobile edge servers 210, based on the data collected from the application server 418. The sensor data collector 420 is configured to collect the IoT data from sensors associated with the set of IoT devices 204. The sensor data processor 430 is configured to process the IoT data collected by the sensor data collector 420. The sensor data processor 430 is further configured to process the data associated with the applications and services that interacts the with the set of IoT devices 204. The sensor data processor 430 obtains the data associated with the applications and services from the application server 418.

In an embodiment of the disclosure, the sensor data processor 430 transforms raw data into useful information that can be used for decision-making and management. These components work together to create the system 202 that can dynamically manage and support the set of IoT devices 204 using mobile edge servers, ensuring efficient operation, data collection, and device management.

Figure 5:
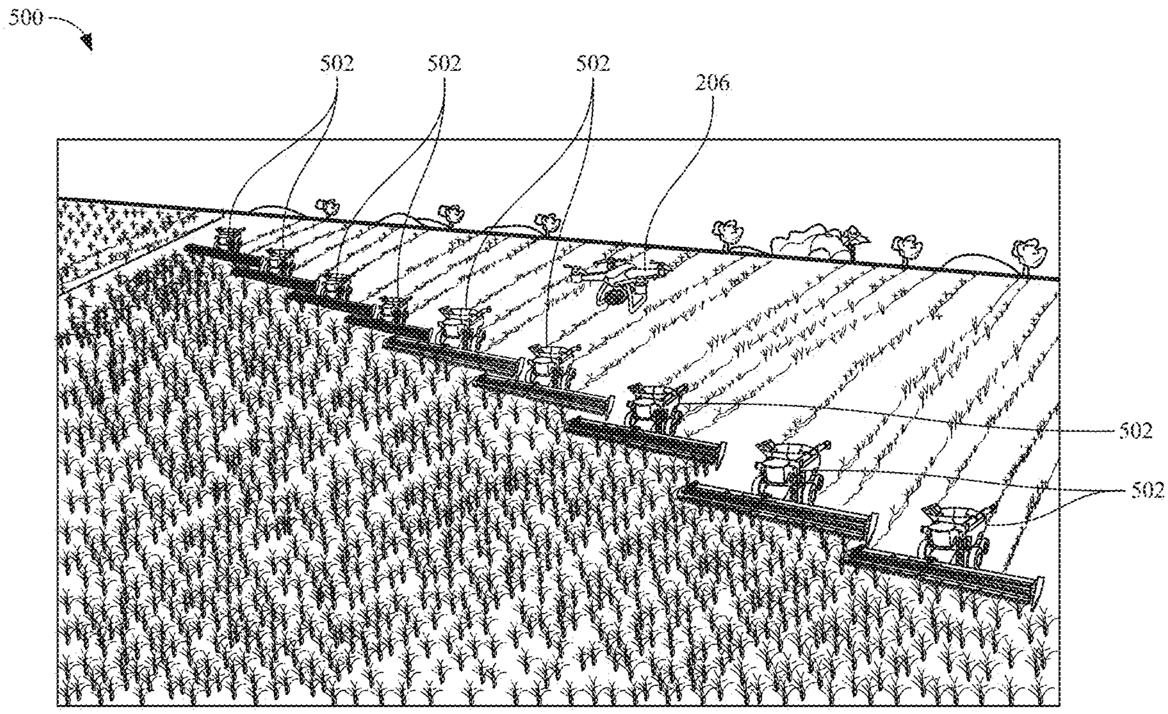
FIG. 5 is a diagram that illustrates an exemplary use-case scenario for deploying at least one first mobile edge server at a centroid of a set of IoT devices, in accordance with an embodiment of the disclosure.

FIG. 5 is a diagram that illustrates an exemplary use-case scenario for deploying the at least one first mobile edge server 206 at the centroid of a set of IoT devices 204, in accordance with an embodiment of the disclosure. FIG. 5 is explained in conjunction with elements from FIG. 1, FIG. 2, FIG. 3 and FIG. 4.

As shown in diagram 500, the use case scenario includes managing the set of IoT devices 204 (e.g., a plurality of IoT-enabled harvesting devices 502) on a farm using the at least one first mobile edge server 206. The system 202 detects a trigger to initiate management of the plurality of IoT-enabled harvesting devices 502 via the at least one first mobile edge server 206. Further, the system 202 obtains the set of attributes and determines the weighting factor of each IoT device of the set of IoT devices 204 based on the set of attributes. Using the first set of spatial coordinates of the set of IoT devices 204 and the weighting factors, the system 202 calculates a weighted centroid, which represents the position for the at least one first mobile edge server 206 to manage the plurality of IoT-enabled harvesting devices 502. The at least one first mobile edge server 206 is deployed at this weighted centroid. As the plurality of IoT-enabled harvesting devices 502 moves, the system 202 continuously recalculates the weighted centroid and repositions the at least one first mobile edge server 206. This dynamic management ensures that the plurality of IoT-enabled harvesting devices 502 remain within the distance D of the at least one first mobile edge server 206, facilitating seamless communication and operational efficiency.

In a use-case scenario, the system 202 manages IoT-enabled tracking devices attached to sheep in a grazing field. A mobile edge server calculates the weighted centroid based on the sheep's locations, priority, and movement patterns, ensuring positioning for data collection and monitoring. The mobile edge server dynamically adjusts its position as the sheep move, maintaining efficient connectivity and real-time tracking.

In a use-case scenario, the system 202 supports the set of IoT devices 204 worn by underwater engineers performing maintenance on an oil rig. The mobile edge server determines the weighted centroid of the engineers' positions, considering factors like criticality and task priority. The mobile edge server is positioned to ensure seamless communication, data processing, and safety monitoring, even as the engineers move through different underwater zones.

Figure 6:
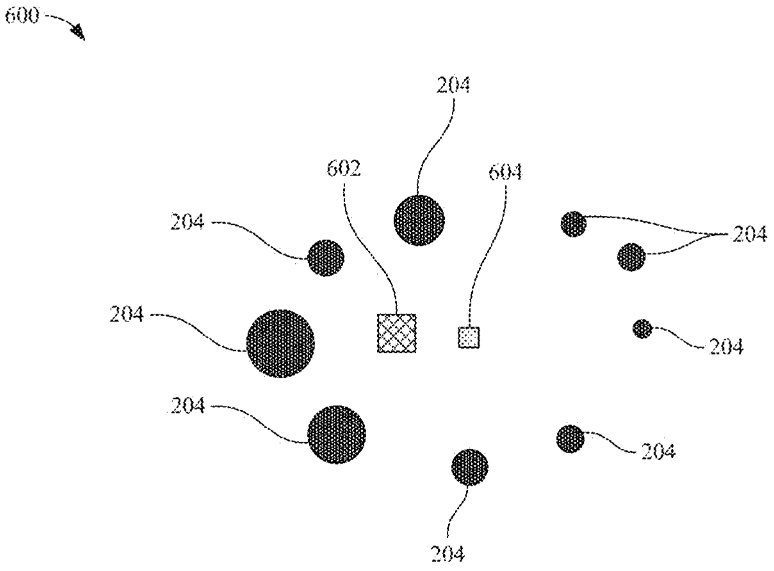
FIG. 6 is a diagram that illustrates an exemplary use-case scenario for deploying the at least one first mobile edge server at a weighted centroid of the set of IoT devices, in accordance with an embodiment of the disclosure.

FIG. 6 is a diagram that illustrates an exemplary use-case scenario for deploying at least one first mobile edge server 206 at the weighted centroid of the set of IoT devices 204, in accordance with an embodiment of the disclosure. FIG. 6 is explained in conjunction with elements from FIG. 1, FIG. 2, FIG. 3, FIG. 4, and FIG. 5.

As shown in diagram 600, the concept of the weighted centroid 602 is shown in the context of managing the set of IoT devices 204. The system 202 detects the trigger to initiate management of the set of devices via the at least one first mobile edge server 206. Each IoT device of the set of IoT devices 204 has the set of attributes, such as priority, criticality, and operational relevance, which are used to determine the weighting factor. Further, the system 202 calculates a mean center 604 of the set of IoT devices 204 representing a geometric center of the set of IoT devices 204. The mean center 604 is calculated using the first set of spatial coordinates of the set of IoT devices 204. Further, the system 202 calculates a weighted centroid 602 based on the spatial coordinates, the mean center 604, and the weighting factors. This weighted centroid 602 represents the position for the at least one first mobile edge server 206 to manage the set of IoT devices 204. Furthermore, the at least one first mobile edge server 206 is deployed at the weighted centroid. As the IoT devices move or their attributes change, the system 202 continuously recalculates the weighted centroid 602 and repositions the edge server accordingly, maintaining connectivity and performance. This dynamic management ensures that all devices remain within the operational parameters, enhancing overall system efficiency.

Figure 7:
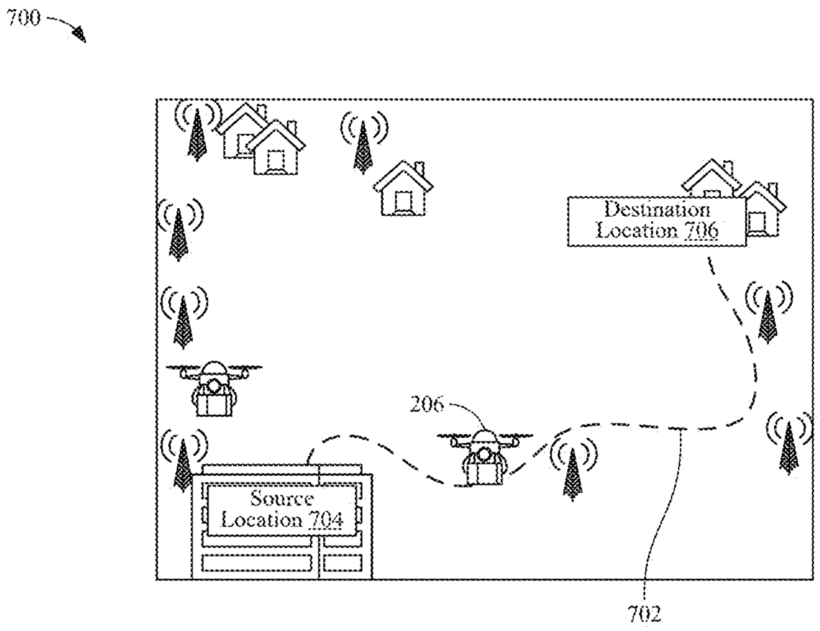
FIG. 7 is a diagram that illustrates an exemplary use-case scenario for traversing the at least one first mobile edge server at a path, in accordance with an embodiment of the disclosure.

FIG. 7 is a diagram that illustrates an exemplary use-case scenario for traversing the at the least one first mobile edge server along a path, in accordance with an embodiment of the disclosure. FIG. 7 is explained in conjunction with elements from FIG. 1, FIG. 2, FIG. 3, FIG. 4, FIG. 5, and FIG. 6.

As shown, the diagram 700 shows the path 702 between a source location 704 and a destination location 706. The system 202 configures the at least one first mobile edge server 206 to traverse the path. The path is used to maintain connectivity of the at least one first mobile edge server 206 with the set of IoT devices 204.

Figure 8:
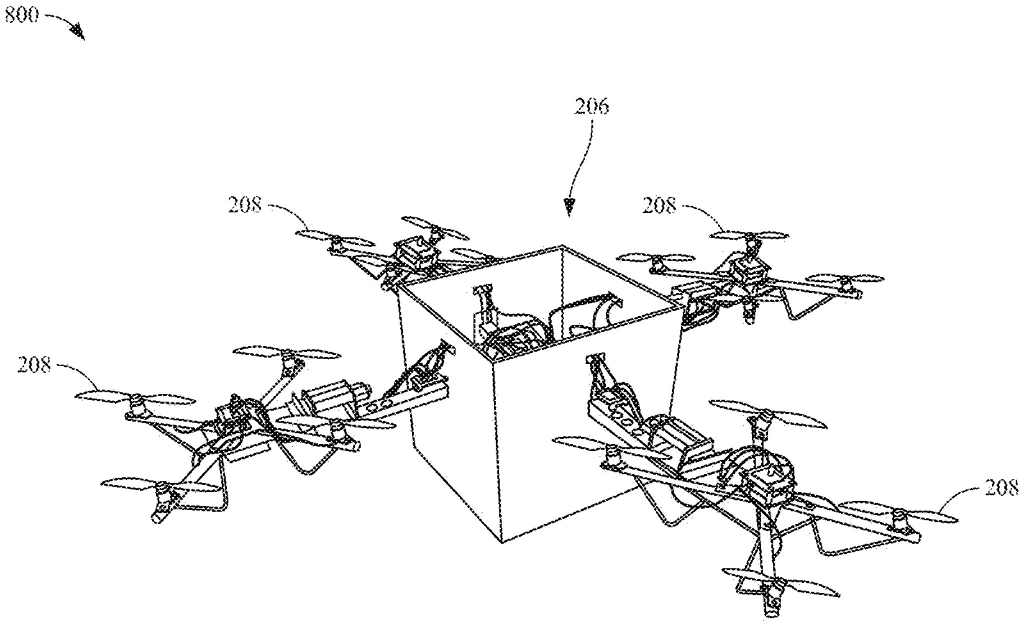
FIG. 8 is a diagram that illustrates an exemplary use-case scenario for integrating the at least one first mobile edge server with one or more second mobile edge servers, in accordance with an embodiment of the disclosure.

FIG. 8 is a diagram that illustrates an exemplary use-case scenario for integrating the at least one first mobile edge server 206 with the one or more second mobile edge servers 208, in accordance with an embodiment of the disclosure. FIG. 8 is explained in conjunction with elements from FIG. 1, FIG. 2, FIG. 3, FIG. 4, FIG. 5, FIG. 6, and FIG. 7.

As shown, diagram 800 shows the integration of the at least one first mobile edge server 206 with the one or more second mobile edge servers 208. The one or more second mobile edge servers 208 can carry and launch the at least one first mobile edge server 206 (or vice versa) on demand to distribute processing tasks or enhance coverage. This integration is achieved using mechanisms like the hanging operation, the pulling operation, the dragging operation, or the loading operation. The system 202 dynamically allocates the one or more management tasks between the at least one first mobile edge server 206 and the one or more second mobile edge servers 208 based on compute power needs, ensuring efficient management of the set of IoT devices.

Figure 9:
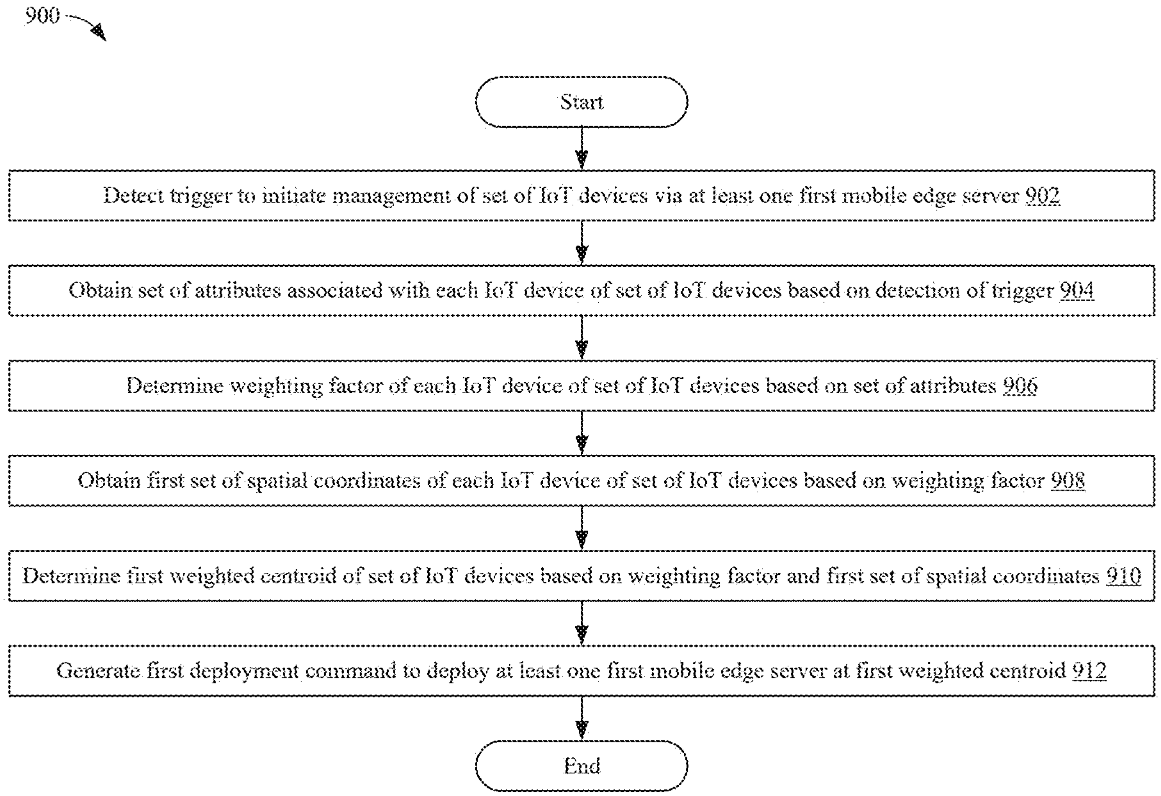
FIG. 9 is a diagram that illustrates a first flowchart of an exemplary method for managing the mobility of the edge servers, in accordance with an embodiment of the disclosure.

FIG. 9 is a diagram that illustrates a first flowchart of an exemplary method for managing the mobility of edge servers, in accordance with an embodiment of the disclosure. FIG. 9 is explained in conjunction with elements from FIG. 1, FIG. 2, FIG. 3, FIG. 4, FIG. 5, FIG. 6, FIG. 7, and FIG. 8. The operations of the exemplary computer-implemented method are executed by any computing system, for example, by the computer 102 of FIG. 1 or the system 202 of FIG. 2. The operations of a first flowchart 900 may start at 902.

At 902, a trigger is detected to initiate management of a set of Internet of Things (IoT) devices 204 via the at least one first mobile edge server 206. In an embodiment of the disclosure, the system 202 is configured to detect the trigger to initiate management of the set of IoT devices 204 via the at least one first mobile edge server 206. Details about the detection of the trigger are provided, for example, in FIG. 3.

At 904, a set of attributes associated with each IoT device of the set of IoT devices 204 is obtained based on the detection of the trigger. In an embodiment of the disclosure, the system 202 is configured to obtain the set of attributes associated with each IoT device of the set of IoT devices 204 based on the detection of the trigger. In an embodiment of the disclosure, the set of attributes includes at least one of a priority of each IoT device of the set of IoT devices 204, a criticality level of each IoT device of the set of IoT devices 204, an operational relevance level of each IoT device of the set of IoT devices 204 for a successful execution of the operational activity, latency needs of each IoT device of the set of IoT devices 204, a data generation rate of each IoT device of the set of IoT devices 204, a battery life of each IoT device of the set of IoT devices 204, a connectivity status of each IoT device of the set of IoT devices 204, environmental conditions in proximity of each IoT device of the set of IoT devices 204, a security level of each IoT device of the set of IoT devices 204, historical performance data of each IoT device of the set of IoT devices 204, compliance requirements of each IoT device of the set of IoT devices 204, one or more restricted areas defined for each IoT device of the set of IoT devices 204, or user-defined settings of each IoT device of the set of IoT devices 204. Details on obtaining the set of attributes are provided, for example, in FIG. 3.

At 906, a weighting factor of each IoT device of the set of IoT devices 204 is determined based on the set of attributes. In an embodiment of the disclosure, the system 202 is configured to determine the weighting factor of each IoT device of the set of IoT devices 204 based on the set of attributes. The weighting factor represents the relative importance or priority of each IoT device of the set of IoT devices 204 in the context of the operational activity. For example, in a warehouse, a robot responsible for transporting high-priority goods may be assigned to a higher weighting factor than a robot performing routine maintenance tasks. The weighting factor is used by the system 202 to prioritize the set of IoT devices 204 based on their role, energy efficiency, or criticality to the operation, ensuring that resources are allocated effectively. Details about the determination of the weighting factor are provided, for example, in FIG. 3.

At 908, a first set of spatial coordinates of each IoT device of the set of IoT devices 204 is obtained based on the weighting factor. In an embodiment of the disclosure, the system 202 is configured to obtain the first set of spatial coordinates of each IoT device of the set of IoT devices 204 based on the weighting factor. In an embodiment of the disclosure, each IoT device of the set of IoT devices 204 follows the first set of spatial coordinates during the execution of the operational activity. The set of spatial coordinates defines a physical or logical location of the set of IoT devices 204 during the execution of the operational activity. For example, in a drone delivery system, the set of spatial coordinates may indicate the flight paths for each drone to minimize delivery time. Details on obtaining the first set of spatial coordinates are provided, for example, in FIG. 3.

At 910, a first weighted centroid of the set of IoT devices 204 is determined based on the weighting factor and the first set of spatial coordinates. In an embodiment of the disclosure, the system 202 is configured to determine the first weighted centroid of the set of IoT devices 204 based on the weighting factor and the first set of spatial coordinates. In an embodiment of the disclosure, the weighted centroid represents a central location for the management of the set of IoT devices 204, taking into account their relative importance and positions. For example, in a disaster response scenario, the weighted centroid may be the ideal location for deploying the at least one first mobile edge server 206 to coordinate rescue drones and sensors. This calculation ensures that the management system is positioned to minimize latency and maximize performance. In an embodiment of the disclosure, the first weighted centroid corresponds to a second set of spatial coordinates within a proximity of the first set of spatial coordinates. The at least one first mobile edge server 206 traverses on the second set of spatial coordinates to track the set of IoT devices 204. Details on determining the first weighted centroid are provided, for example, in FIG. 3.

At 912, a first deployment command is generated to deploy the at least one first mobile edge server 206 at the first weighted centroid. In an embodiment of the disclosure, the system 202 is configured to generate the first deployment command to deploy the at least one first mobile edge server 206 at the first weighted centroid. In an embodiment of the disclosure, the at least one first mobile edge server 206 is deployed at the first weighted centroid for the management of the set of IoT devices 204. For example, in a smart agriculture system, the edge server might be deployed near the weighted centroid of IoT sensors monitoring soil moisture and crop health. This ensures that the server is strategically placed to provide low-latency processing, efficient data management, and reliable support for the set of IoT devices 204 during their operational activity. Details on generating the first deployment command are provided, for example, in FIG. 3 and FIG. 4.

While the above operation of the system 202 shown in FIG. 9 is described in a particular sequence, the operation of the system 202 may occur in variations to the sequence in accordance with various embodiments of the disclosure. Further, details related to the operation of FIG. 9, which are already covered in the description related to FIG. 1 to FIG. 8 are not discussed again in detail here for the sake of brevity.

Figure 10:
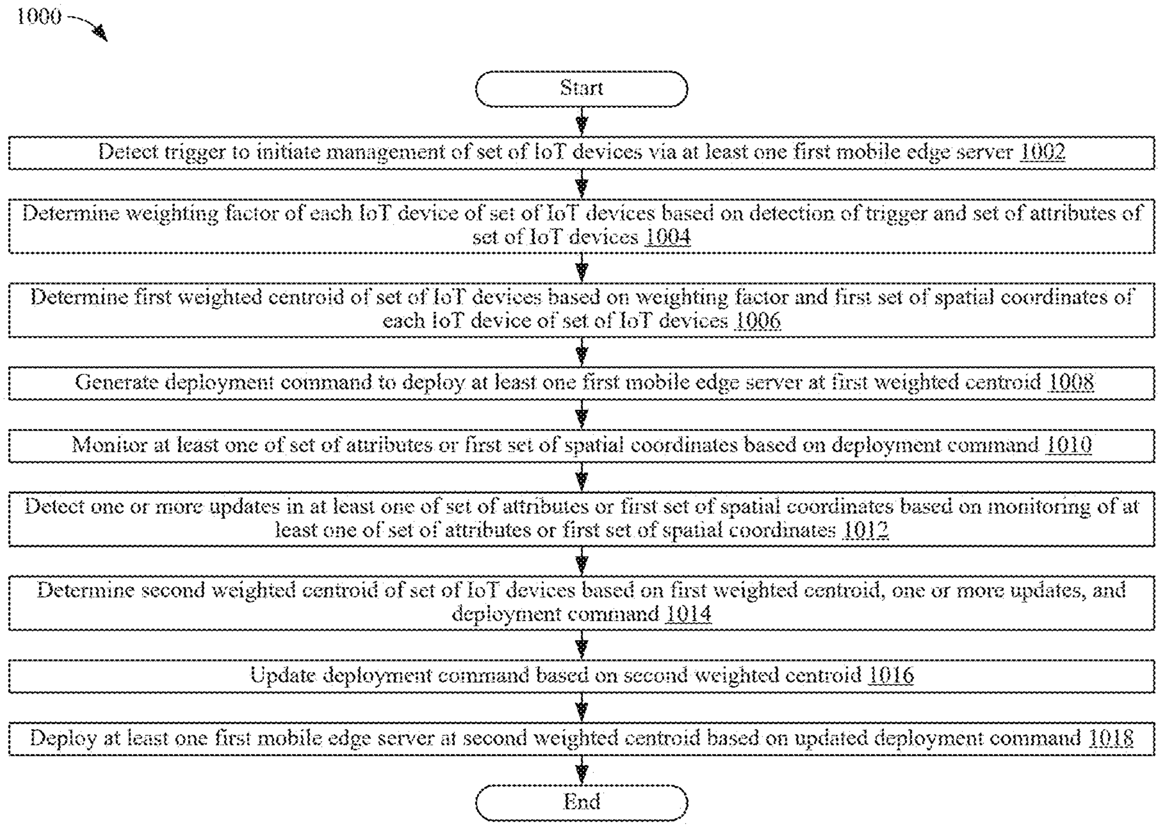
FIG. 10 is a diagram that illustrates a second flowchart of an exemplary method for managing the mobility of the edge servers, in accordance with an embodiment of the disclosure.

FIG. 10 is a diagram that illustrates a second flowchart of an exemplary method for managing the mobility of the edge servers, in accordance with an embodiment of the disclosure. FIG. 10 is explained in conjunction with elements from FIG. 1, FIG. 2, FIG. 3, FIG. 4, FIG. 5, FIG. 6, FIG. 7, FIG. 8, and FIG. 9. The operations of the exemplary computer-implemented method are executed by any computing system, for example, by the computer 102 of FIG. 1 or the system 202 of FIG. 2. The operations of a second flowchart 1000 may start at 1002.

At 1002, a trigger is detected to initiate management of a set of Internet of Things (IoT) devices 204 via at least one first mobile edge server 206. In an embodiment of the disclosure, the system 202 is configured to detect the trigger to initiate management of the set of IoT devices 204 via the at least one first mobile edge server 206. In an embodiment of the disclosure, at least one first mobile edge server 206 is configured to manage the set of IoT devices 204 during an execution of an operational activity by the set of IoT devices 204. Details about the detection of the trigger are provided, for example, in FIG. 3.

At 1004, a weighting factor is determined for each IoT device of the set of IoT devices 204 based on the detection of the trigger and a set of attributes of the set of IoT devices 204. In an embodiment of the disclosure, the system 202 is configured to determine the weighting factor of each IoT device of the set of IoT devices 204 based on the detection of the trigger and a set of attributes of the set of IoT devices 204. Details about the determination of the weighting factor are provided, for example, in FIG. 3.

At 1006, a first weighted centroid of the set of IoT devices 204 is determined based on the weighting factor and a first set of spatial coordinates of each IoT device of the set of IoT devices 204. In an embodiment of the disclosure, the system 202 is configured to determine the first weighted centroid of the set of IoT devices 204 based on the weighting factor and the first set of spatial coordinates of each IoT device of the set of IoT devices 204. Details on determining the first weighted centroid are provided, for example, in FIG. 3.

At 1008, a deployment command is generated to deploy the at least one first mobile edge server 206 at the first weighted centroid. In an embodiment of the disclosure, the system 202 is configured to generate the deployment command to deploy the at least one first mobile edge server 206 at the first weighted centroid. In an embodiment of the disclosure, the at least one first mobile edge server 206 is deployed at the first weighted centroid to manage the set of IoT devices 204. Details about the generation of the deployment command are provided, for example, in FIG. 3 and FIG. 4.

At 1010, at least one of the set of attributes or the first set of spatial coordinates are monitored based on the deployment command. In an embodiment of the disclosure, the system 202 is configured to monitor the at least one of the set of attributes or the first set of spatial coordinates based on the deployment command. In an embodiment of the disclosure, the monitoring of the at least one of the set of attributes or the first set of spatial coordinates is in the duration of the execution of the operational activity. For example, the set of attributes includes at least one of a priority of each IoT device of the set of IoT devices 204, a criticality level of each IoT device of the set of IoT devices 204, an operational relevance level of each IoT device of the set of IoT devices 204 for a successful execution of the operational activity, latency needs of each IoT device of the set of IoT devices 204, a data generation rate of each IoT device of the set of IoT devices 204, a battery life of each IoT device of the set of IoT devices 204, a connectivity status of each IoT device of the set of IoT devices 204, environmental conditions in proximity of each IoT device of the set of IoT devices 204, a security level of each IoT device of the set of IoT devices 204, historical performance data of each IoT device of the set of IoT devices 204, compliance requirements of each IoT device of the set of IoT devices 204, one or more restricted areas defined for each IoT device of the set of IoT devices 204, or user-defined settings of each IoT device of the set of IoT devices 204. Details on monitoring the at least one of the set of attributes or the first set of spatial coordinates are provided, for example, in FIG. 3.

At 1012, one or more updates are detected in the at least one of the set of attributes or the first set of spatial coordinates based on the monitoring of the at least one of the set of attributes or the first set of spatial coordinates. In an embodiment of the disclosure, the system 202 is configured to detect one or more updates in the at least one of the set of attributes or the first set of spatial coordinates based on the monitoring of the at least one of the set of attributes or the first set of spatial coordinates. Details on detecting the one or more updates are provided, for example, in FIG. 3, FIG. 4, FIG. 5, and FIG. 6.

At 1014, a second weighted centroid of the set of IoT devices 204 is determined based on the first weighted centroid, the one or more updates, and the deployment command. In an embodiment of the disclosure, the system 202 is configured to determine the second weighted centroid of the set of IoT devices 204 based on the first weighted centroid, the one or more updates, and the deployment command. Details on determining the second weighted centroid of the set of IoT devices 204 are provided, for example, in FIG. 3, FIG. 4, FIG. 5, and FIG. 6.

At 1016, the deployment command is updated based on the second weighted centroid. In an embodiment of the disclosure, the system 202 is configured to update the deployment command based on the second weighted centroid. Details on updating the deployment command are provided, for example, in FIG. 3.

At 1018, the at least one first mobile edge server 206 is deployed at the second weighted centroid based on the updated deployment command. In an embodiment of the disclosure, the system 202 is configured to deploy the at least one first mobile edge server 206 at the second weighted centroid based on the updated deployment command. Details on deploying the at least one first mobile edge server 206 at the second weighted centroid are provided, for example, in FIG. 3 and FIG. 4.

While the above operation of the system 202 shown in FIG. 10 is described in a particular sequence, the operation may occur in variations to the sequence in accordance with various embodiments of the disclosure. Further, details related to the operation of FIG. 10, which is already covered in the description related to FIG. 1 to FIG. 9 are not discussed again in detail here for the sake of brevity.

The system 202 presents multiple advantages. By calculating the weighted centroid of the set of IoT devices 204 based on the set of attributes such as priority, criticality, and latency needs, the system 202 ensures that mobile edge servers are positioned at the weighted centroid, which in turn reduces unnecessary movement and resource consumption, leading to efficient memory utilization as data is collected and processed only from relevant devices. The system 202 distributes processing tasks across multiple mobile edge servers (using mechanisms, such as the hanging operation, the pulling operation, the dragging operation, or the loading operation) to ensure enhanced processing power, as computational loads are balanced among available mobile edge servers, preventing overburdening of any single server. The scalability of the system 202 is achieved through its auto-scaling engine, which provides additional mobile edge servers on demand. This allows the system 202 to handle increased workloads without requiring permanent over-provisioning of hardware. Additionally, the system 202 performs dynamic recalculation of the weighted centroid and repositioning of servers ensuring energy efficiency, as the mobile edge servers are only active and deployed when the trigger is detected, reducing overall energy consumption.

By continuously monitoring and updating the spatial coordinates and attributes of the set of IoT devices 204, the system 202 ensures improved data collection and processing, enabling faster and more accurate insights. The flexible integration of additional servers allows the system 202 to work in changing operational demands seamlessly. Further, the system 202 maintains connectivity with the first set of IoT devices 204 through precise positioning and load balancing which results in cost-effectiveness, as it minimizes the need for excessive hardware and operational overhead. These advantages collectively result in an efficient, scalable, and reliable system for the management of the set of IoT devices 204.

In various embodiments of the disclosure, a computer program product for managing mobility of edge servers is described. The computer program product includes one or more computer-readable storage medium and program instructions stored on the one or more computer-readable storage media to perform operations. The operation includes detecting a trigger to initiate management of a set of Internet of Things (IoT) devices via at least one first mobile edge server 206. The at least one first mobile edge server 206 is configured to manage the set of IoT devices 204 during an execution of an operational activity by the set of IoT devices 204. The operation further includes obtaining a set of attributes associated with each IoT device of the set of IoT devices 204 based on the detection of the trigger. Further, the operation includes determining a weighting factor of each IoT device of the set of IoT devices 204 based on the set of attributes. The operation further includes obtaining a first set of spatial coordinates of each IoT device of the set of IoT devices 204 based on the weighting factor. Each IoT device of the set of IoT devices 204 follows the first set of spatial coordinates during the execution of the operational activity. The operation also includes determining a first weighted centroid of the set of IoT devices 204 based on the weighting factor and the first set of spatial coordinates. Further, the operation includes generating a deployment command to deploy the at least one first mobile edge server 206 at the first weighted centroid. The at least one first mobile edge server 206 is deployed at the first weighted centroid for the management of the set of IoT devices 204.

The descriptions of the various embodiments of the disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

detecting, by a computer, a trigger to initiate management of a set of Internet of Things (IoT) devices via at least one first mobile edge server, wherein the at least one first mobile edge server is configured to manage the set of IoT devices during an execution of an operational activity by the set of IoT devices;

obtaining, by the computer, a set of attributes associated with each IoT device of the set of IoT devices based on the detecting of the trigger;

determining, by the computer, a weighting factor of each IoT device of the set of IoT devices based on the set of attributes;

obtaining, by the computer, a first set of spatial coordinates of each IoT device of the set of IoT devices based on the weighting factor, wherein each IoT device of the set of IoT devices follows the first set of spatial coordinates during the execution of the operational activity;

determining, by the computer, a first weighted centroid of the set of IoT devices based on the weighting factor and the first set of spatial coordinates; and generating, by the computer, a deployment command to deploy the at least one first mobile edge server at the first weighted centroid, wherein the at least one first mobile edge server is deployed at the first weighted centroid for the management of the set of IoT devices.

2. The computer-implemented method of claim 1, wherein the set of attributes is selected from the group consisting of a priority of each IoT device of the set of IoT devices, a criticality level of each IoT device of the set of IoT devices, an operational relevance level of each IoT device of the set of IoT devices for a successful execution of the operational activity, latency needs of each IoT device of the set of IoT devices, a data generation rate of each IoT device of the set of IoT devices, a battery life of each IoT device of the set of IoT devices, a connectivity status of each IoT device of the set of IoT devices, environmental conditions in proximity of each IoT device of the set of IoT devices, a security level of each IoT device of the set of IoT devices, historical performance data of each IoT device of the set of IoT devices, compliance requirements of each IoT device of the set of IoT devices, one or more restricted areas defined for each IoT device of the set of IoT devices, or user-defined settings of each IoT device of the set of IoT devices.

3. The computer-implemented method of claim 1, further comprising:

establishing, by the computer, a first communication session between the set of IoT devices and the at least one first mobile edge server using one or more communication processes.

4. The computer-implemented method of claim 1, further comprising:

monitoring, by the computer, at least one of the set of attributes or the first set of spatial coordinates based on the deployment command, wherein the monitoring of the at least one of the set of attributes or the first set of spatial coordinates is in a duration of the execution of the operational activity;

detecting, by the computer, one or more updates in the at least one of the set of attributes or the first set of spatial coordinates based on the monitoring of the at least one of the set of attributes or the first set of spatial coordinates;

determining, by the computer, a second weighted centroid of the set of IoT devices based on the first weighted centroid, the one or more updates, and the deployment command;

updating, by the computer, the deployment command based on the second weighted centroid; and deploying, by the computer, the at least one first mobile edge server at the second weighted centroid based on the updated deployment command.

5. The computer-implemented method of claim 3, further comprising:

determining, by the computer, one or more management tasks associated with the at least one first mobile edge server based on the deployment command, the first weighted centroid, and one or more operational parameters associated with the operational activity;

determining, by the computer, a first compute power for executing the one or more management tasks;

determining, by the computer, a second compute power of the at least one first mobile edge server based on the determination of the first compute power;

comparing, by the computer, the second compute power with the first compute power;

determining, by the computer, that the second compute power is less than the first compute power based on the comparing;

detecting, by the computer, one or more second mobile edge servers based on one or more server parameters and the determination that the second compute power is less than the first compute power; and allocating, by the computer, the one or more management tasks to the at least one of the one or more second mobile edge servers or the at least one first mobile edge server.

6. The computer-implemented method of claim 5, further comprising:

determining, by the computer, one or more integration mechanisms based on the allocation of the one or more management tasks, wherein the determining of the one or more integration mechanisms is for integration of the at least one first mobile edge server with the one or more second mobile edge servers, and wherein the one or more integration mechanisms comprise at least one of a hanging operation, a pulling operation, a dragging operation, or a loading operation;

generating, by the computer, an integration command based on the one or more integration mechanisms, wherein the integration command is generated for the integration of the at least one first mobile edge server with the one or more second mobile edge servers;

executing, by the computer, the integration command to integrate the at least one first mobile edge server with the one or more second mobile edge servers; and executing, by the computer, the one or more management tasks based on the execution of the integration command.

7. The computer-implemented method of claim 5, wherein the one or more server parameters comprise at least one of an availability of the one or more second mobile edge servers, a distance between the at least one first mobile edge server and the one or more second mobile edge servers, a current load on the one or more second mobile edge servers, a processing power of the one or more second mobile edge servers, a network latency of the one or more second mobile edge servers, energy consumption by the one or more second mobile edge servers, or a geographical constraint of the one or more second mobile edge servers.

8. The computer-implemented method of claim 6, further comprising:

monitoring, by the computer, the at least one first mobile edge server based on the generation of the deployment command, wherein the monitoring of the at least one first mobile edge server is during the execution of the operational activity;

detecting, by the computer, one or more replacement conditions based on the monitoring of the at least one first mobile edge server, wherein the one or more replacement conditions are associated with replacing the at least one first mobile edge server with one or more third mobile edge servers;

detecting, by the computer, the one or more third mobile edge servers based on the one or more replacement conditions and the one or more server parameters associated with the one or more third mobile edge servers;

establishing, by the computer, a second communication session between the at least one first mobile edge server and the one or more third mobile edge servers based on one or more communication processes and the detecting of the one or more third mobile edge servers;

transmitting, by the computer, IoT data associated with the set of IoT devices from the at least one first mobile edge server to the one or more third mobile edge servers, wherein the IoT data is transmitted to the one or more third mobile edge servers via the second communication session, and wherein the IoT data corresponds to data associated with the set of IoT devices collected by the at least one first mobile edge server; and allocating, by the computer, the one or more management tasks to the one or more third mobile edge servers based on the transmitting of the IoT data.

9. The computer-implemented method of claim 8, wherein the one or more replacement conditions comprise at least one of an insufficient battery in the at least one first mobile edge server, insufficient fuel in the at least one first mobile edge server, a transition of the at least one first mobile edge server from a first medium to a second medium, overheating of the at least one first mobile edge server, hardware malfunction in the at least one first mobile edge server, network connectivity issues, a scheduled maintenance of the at least one first mobile edge server, or one or more environmental conditions in a vicinity of the at least one first mobile edge server.

10. The computer-implemented method of claim 1, wherein the computer-implemented method is implemented in the at least one first mobile edge server.

11. The computer-implemented method of claim 1, wherein the first weighted centroid corresponds to a second set of spatial coordinates within a proximity of the first set of spatial coordinates, and wherein the at least one first mobile edge server traverses on the second set of spatial coordinates to track the set of IoT devices.

12. A computer system, comprising:

a processor set;

one or more computer-readable storage media; and program instructions stored on the one or more computer-readable storage media, the program instructions executable by the processor set to cause the processor set to:

detect a trigger to initiate management of a set of Internet of Things (IoT) devices via at least one first mobile edge server, wherein the at least one first mobile edge server is configured to manage the set of IoT devices during an execution of an operational activity by the set of IoT devices;

determine a weighting factor of each IoT device of the set of IoT devices based on the detecting of the trigger and a set of attributes of the set of IoT devices;

determine a first weighted centroid of the set of IoT devices based on the weighting factor and a first set of spatial coordinates of each IoT device of the set of IoT devices;

generate a deployment command to deploy the at least one first mobile edge server at the first weighted centroid, wherein the at least one first mobile edge server is deployed at the first weighted centroid to manage the set of IoT devices;

monitor at least one of the set of attributes or the first set of spatial coordinates based on the deployment command, wherein the monitoring of the at least one of the set of attributes or the first set of spatial coordinates is in a duration of the execution of the operational activity;

detect one or more updates in the at least one of the set of attributes or the first set of spatial coordinates based on the monitoring of the at least one of the set of attributes or the first set of spatial coordinates;

determine a second weighted centroid of the set of IoT devices based on the first weighted centroid, the one or more updates, and the deployment command;

update the deployment command based on the second weighted centroid; and deploy the at least one first mobile edge server at the second weighted centroid based on the updated deployment command.

13. The computer system of claim 12, wherein the set of attributes is selected from the group consisting of a priority of each IoT device of the set of IoT devices, a criticality level of each IoT device of the set of IoT devices, an operational relevance level of each IoT device of the set of IoT devices for a successful execution of the operational activity, latency needs of each IoT device of the set of IoT devices, a data generation rate of each IoT device of the set of IoT devices, a battery life of each IoT device of the set of IoT devices, a connectivity status of each IoT device of the set of IoT devices, environmental conditions in proximity of each IoT device of the set of IoT devices, a security level of each IoT device of the set of IoT devices, historical performance data of each IoT device of the set of IoT devices, compliance requirements of each IoT device of the set of IoT devices, one or more restricted areas defined for each IoT device of the set of IoT devices, or user-defined settings of each IoT device of the set of IoT devices.

14. The computer system of claim 12, wherein the program instructions further cause the processor set to:

establish a first communication session between the set of IoT devices and the at least one first mobile edge server via one or more communication processes.

15. The computer system of claim 14, wherein the program instructions further cause the processor set to:

determine one or more management tasks associated with the at least one first mobile edge server based on the deployment command, the first weighted centroid, and one or more operational parameters associated with the operational activity;

determine a first compute power to execute the one or more management tasks;

determine a second compute power of the at least one first mobile edge server based on the determination of the first compute power;

compare the second compute power with the first compute power;

determine that the second compute power is less than the first compute power based on the comparing;

detect one or more second mobile edge servers based on one or more server parameters and the determination that the second compute power is less than the first compute power; and allocate the one or more management tasks to the at least one of the one or more second mobile edge servers or the at least one first mobile edge server.

16. The computer system of claim 15, wherein the program instructions further cause the processor set to:

determine one or more integration mechanisms based on the allocation of the one or more management tasks, wherein the determining of the one or more integration mechanisms is for integration of the at least one first mobile edge server with the one or more second mobile edge servers, and wherein the one or more integration mechanisms comprise at least one of a hanging operation, a pulling operation, a dragging operation, or a loading operation;

generate an integration command based on the one or more integration mechanisms, wherein the integration command is generated for the integration of the at least one first mobile edge server with the one or more second mobile edge servers;

execute the integration command to integrate the at least one first mobile edge server with the one or more second mobile edge servers; and execute the one or more management tasks based on the execution of the integration command.

17. The computer system of claim 15, wherein the one or more server parameters comprise at least one of an availability of the one or more second mobile edge servers, a distance between the at least one first mobile edge server and the one or more second mobile edge servers, a current load on the one or more second mobile edge servers, a processing power of the one or more second mobile edge servers, a network latency of the one or more second mobile edge servers, energy consumption by the one or more second mobile edge servers, or a geographical constraint of the one or more second mobile edge servers.

18. The computer system of claim 16, wherein the program instructions further cause the processor set to:

monitor the at least one first mobile edge server based on the updated deployment command, wherein the at least one first mobile edge server is monitored in the duration of the execution of the operational activity;

detect one or more replacement conditions based on the monitoring of the at least one first mobile edge server, wherein the one or more replacement conditions are associated with replacement of the at least one first mobile edge server with one or more third mobile edge servers;

detect the one or more third mobile edge servers based on the one or more replacement conditions and the one or more server parameters associated with the one or more third mobile edge servers;

establish a second communication session between the at least one first mobile edge server and the one or more third mobile edge servers based on one or more communication processes and the detecting of the one or more third mobile edge servers;

transmit IoT data associated with the set of IoT devices from the at least one first mobile edge server to the one or more third mobile edge servers, wherein the IoT data is transmitted to the one or more third mobile edge servers via the second communication session, and wherein the IoT data corresponds to data associated with the set of IoT devices collected by the at least one first mobile edge server; and allocate the one or more management tasks to the one or more third mobile edge servers based on the transmitting of the IoT data.

19. The computer system of claim 18, wherein the one or more replacement conditions comprise at least one of an insufficient battery in the at least one first mobile edge server, insufficient fuel in the at least one first mobile edge server, a transition of the at least one first mobile edge server from a first medium to a second medium, overheating of the at least one first mobile edge server, hardware malfunction in the at least one first mobile edge server, network connectivity issues, a scheduled maintenance of the at least one first mobile edge server, or one or more environmental conditions in a vicinity of the at least one first mobile edge server.

20. A computer program product for mobility management of edge servers in a computing environment, the computer program product comprising:

one or more computer-readable storage media; and program instructions stored on the one or more computer-readable storage media to perform operations comprising:

detecting a trigger to initiate management of a set of Internet of Things (IoT) devices via at least one first mobile edge server, wherein the at least one first mobile edge server is configured to manage the set of IoT devices during an execution of an operational activity by the set of IoT devices;

obtaining a set of attributes associated with each IoT device of the set of IoT devices based on the detecting of the trigger;

determining a weighting factor of each IoT device of the set of IoT devices based on the set of attributes;

obtaining a first set of spatial coordinates of each IoT device of the set of IoT devices based on the weighting factor, wherein each IoT device of the set of IoT devices follows the first set of spatial coordinates during the execution of the operational activity;

determining a first weighted centroid of the set of IoT devices based on the weighting factor and the first set of spatial coordinates; and generating a deployment command to deploy the at least one first mobile edge server at the first weighted centroid, wherein the at least one first mobile edge server is deployed at the first weighted centroid for the management of the set of IoT devices.

* * * * *